(12) United States Patent
Mizoguchi et al.

(10) Patent No.: US 10,138,842 B2
(45) Date of Patent: Nov. 27, 2018

(54) APPARATUS FOR UTILIZING HEAT WASTED FROM ENGINE

(71) Applicant: SANDEN HOLDINGS CORPORATION, Isesaki-shi (JP)

(72) Inventors: Shinichiro Mizoguchi, Kanagawa (JP); Hiroyuki Nagai, Kanagawa (JP); Tomonori Haraguchi, Isesaki (JP)

(73) Assignee: SANDEN HOLDINGS CORPORATION, Gunma (JP)

( * ) Notice: Subject to any disclaimer, the term of this patent is extended or adjusted under 35 U.S.C. 154(b) by 49 days.

(21) Appl. No.: 15/311,235

(22) PCT Filed: May 14, 2015

(86) PCT No.: PCT/JP2015/063925
§ 371 (c)(1),
(2) Date: Nov. 15, 2016

(87) PCT Pub. No.: WO2015/174497
PCT Pub. Date: Nov. 19, 2015

(65) Prior Publication Data
US 2017/0082061 A1    Mar. 23, 2017

(30) Foreign Application Priority Data
May 15, 2014    (JP) ................ 2014-101770

(51) Int. Cl.
*F02G 5/02*    (2006.01)
*F02G 5/04*    (2006.01)
(Continued)

(52) U.S. Cl.
CPC ............ *F02G 5/04* (2013.01); *F01D 25/00* (2013.01); *F01K 23/06* (2013.01); *F01K 23/065* (2013.01);
(Continued)

(58) Field of Classification Search
CPC ........ F01K 23/06; F01K 23/065; F01D 25/00; F02G 5/02; F02G 5/04; F02G 2254/15; F02G 2260/00; Y02T 10/166
See application file for complete search history.

(56) References Cited

U.S. PATENT DOCUMENTS

2010/0294217 A1* 11/2010 Kasuya ................ F01K 9/003
                                                       123/41.55
2015/1004735    2/2015 Ishikawa et al.

FOREIGN PATENT DOCUMENTS

JP    2010-203284    9/2010
JP    2012-193690    10/2012
(Continued)

*Primary Examiner* — Audrey K Bradley
(74) *Attorney, Agent, or Firm* — Cozen O'Connor

(57) ABSTRACT

Apparatus for utilizing heat wasted from an engine includes: a Rankine cycle (31); a transmission mechanism that couples an output shaft of an expansion device (37) to a rotary shaft of an engine via an electromagnetic clutch (32) that can be engaged and disengaged; a passage (65) through which refrigerant exiting a heat exchanger (36) flows so as to bypass the expansion device (37); and a bypass valve (66) interposed in the passage. To stop the expansion device (37), the electromagnetic clutch (32) is switched from an engaged state to a disengaged state after switching the bypass valve (66) from a closed state to an open state. If the bypass valve (66) becomes stuck in the closed state, expansion device front-rear differential pressure limiting processing in which a front-rear differential pressure of the expansion device is limited while maintaining the electromagnetic clutch (32) in the engaged state is performed.

11 Claims, 13 Drawing Sheets

(51) Int. Cl.
 *F01K 23/06* (2006.01)
 *F01D 25/00* (2006.01)
(52) U.S. Cl.
 CPC ............ *F02G 5/02* (2013.01); *F02G 2254/15* (2013.01); *F02G 2260/00* (2013.01); *Y02T 10/166* (2013.01)

(56) References Cited

FOREIGN PATENT DOCUMENTS

| | | | |
|---|---|---|---|
| JP | 2013-76370 | 4/2013 | |
| JP | WO 2013046969 A1 * | 4/2013 | ............... F02G 5/04 |
| JP | 2013-100807 | 5/2013 | |
| JP | 2013-133752 | 7/2013 | |
| WO | WO 2012/124768 | 9/2012 | |
| WO | WO 2013/057991 | 4/2013 | |
| WO | WO 2013/099769 | 7/2013 | |

* cited by examiner

APPARATUS FOR UTILIZING HEAT WASTED FROM ENGINE

RELATED APPLICATIONS

This is a U.S. National Phase Application under 35 USC 371 of International Application PCT/JP2015/063925 filed on May 14, 2015.

This application claims the priority of Japanese application no. 2014-101770 filed May 15, 2014, the entire content of which is hereby incorporated by reference.

TECHNICAL FIELD

The present invention relates to an improvement in an apparatus for utilizing heat wasted from an engine.

BACKGROUND ART

There is an apparatus employing the Rankine cycle provided with: a transmission mechanism in which an output shaft of an expansion device is coupled to a rotary shaft of an engine via an electromagnetic clutch that can be engaged and disengaged; a passage through which refrigerant supplied to the expansion device bypasses the expansion device; and a bypass valve interposed in the passage (see Patent Document 1). In this apparatus, the expansion device is stopped by switching the bypass valve from a closed state to an open state, and then switching the electromagnetic clutch from an engaged state to a disengaged state. The reason for this is that when the electromagnetic clutch is switched from the engaged state to the disengaged state before the bypass valve is switched from the closed state to the open state, the expansion device is disconnected from the rotary shaft of the engine such that a no-load state is established, and therefore a rotation speed of the expansion device increases rapidly, resulting in over-rotation of the expansion device, which is to be avoided. By switching the bypass valve from the closed state to the open state first, a front-rear differential pressure of the expansion device is reduced such that the electromagnetic clutch is switched from the engaged state to the disengaged state after the rotation speed of the expansion device has decreased sufficiently. As a result, over-rotation of the expansion device is prevented.

Patent Document 1: JP2012-193690A

SUMMARY OF INVENTION

Now, it is assumed that even when the bypass valve becomes stuck in the closed state, the expansion device is stopped by outputting a signal for switching the bypass valve from the closed state to the open state, and then switching the electromagnetic clutch from the engaged state to the disengaged state. In this case, the front-rear differential pressure of the expansion device does not decrease, and therefore the rotation speed of the expansion device increases rapidly from the timing at which the electromagnetic clutch is switched from the engaged state to the disengaged state, resulting in over-rotation of the expansion device.

However, Patent Document 1 includes no description whatsoever of techniques for dealing with a case where the bypass valve becomes stuck in the closed state.

Hence, it is an object of the present invention to provide an apparatus that can suppress over-rotation of an expansion device even when a bypass valve becomes stuck in a closed state.

An apparatus for utilizing heat wasted from an engine according to the present invention includes a transmission mechanism that couples an output shaft of an expansion device and a rotary shaft of an engine to each other via an electromagnetic clutch that can be engaged and disengaged, a passage through which refrigerant exiting a heat exchanger flows so as to bypass the expansion device, and a bypass valve interposed in the passage. The expansion device is stopped by switching the bypass valve from a closed state to an open state, and then switching the electromagnetic clutch from an engaged state to a disengaged state. A prerequisite of this apparatus for utilizing heat wasted from an engine is that when the bypass valve becomes stuck in the closed state, expansion device front-rear differential pressure limiting processing is performed to limit a front-rear differential pressure of the expansion device while maintaining the electromagnetic clutch in the engaged state.

According to the present invention, over-rotation of the expansion device can be prevented while stopping the expansion device even when the bypass valve is stuck in the closed state.

DESCRIPTION OF EMBODIMENTS

Hereinafter, embodiments of the present invention will be described with reference to the accompanying figures.

(First Embodiment)

Figure 1:
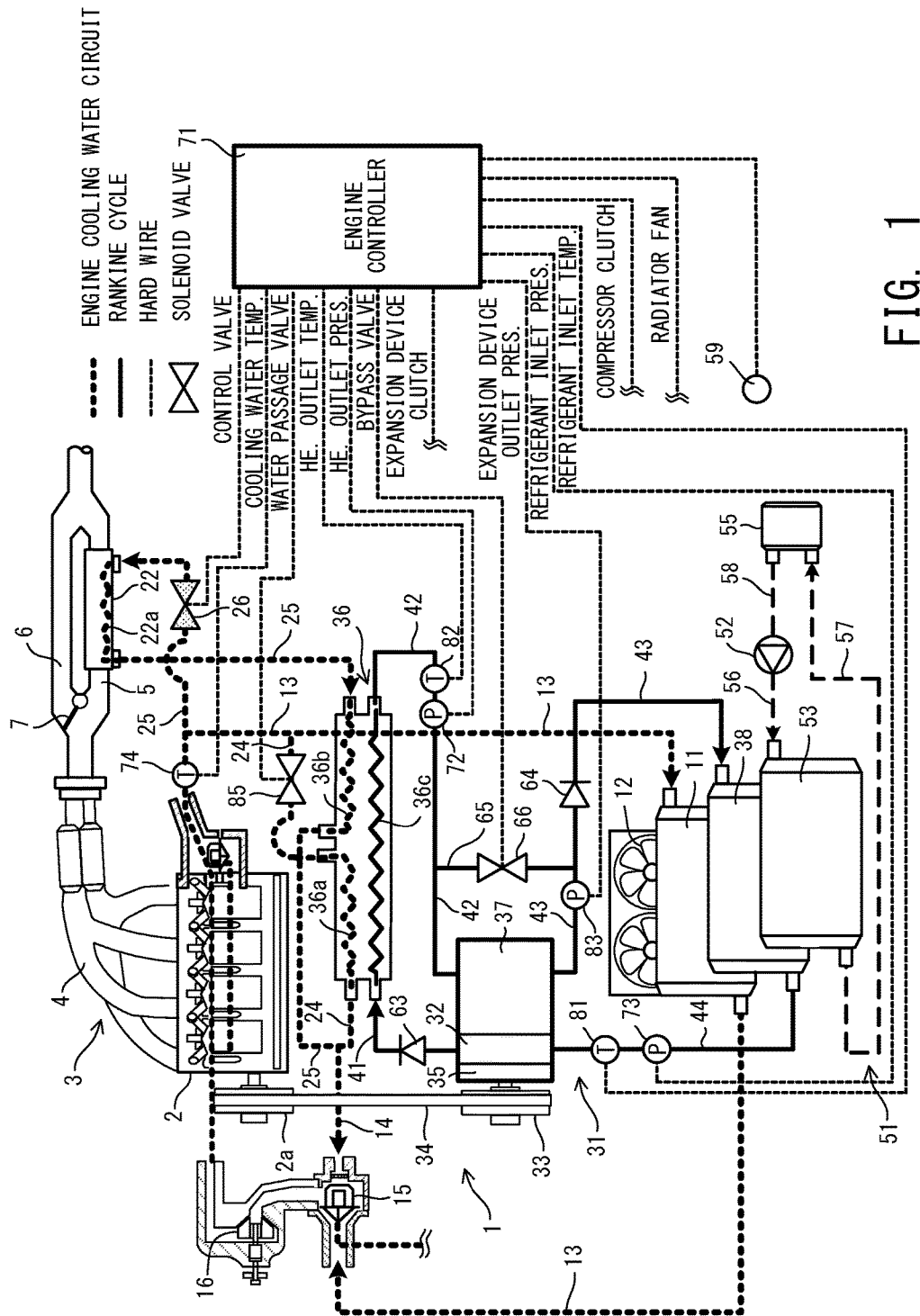
FIG. 1 is a schematic view showing an overall system configuration of a Rankine cycle according to a first embodiment of the present invention.

FIG. 1 is a schematic view showing an overall system configuration of a Rankine cycle according to a first embodiment of the present invention.

First, an engine cooling water circuit will be described. Cooling water exiting an engine 2 at approximately 80 to 90° C. flows separately through a cooling water passage 13 that passes through a radiator 11 and a bypass cooling water passage 14 that bypasses the radiator 11. The two flows then re-converge at a thermostat valve 15 for determining a distribution of cooling water flow rates at which the cooling water flows through the two passages 13, 14, and the cooling water is returned to the engine 2 via a cooling water pump 16. The cooling water pump 16 is driven by the engine 2 such that a rotation speed thereof is synchronized with an engine rotation speed.

The thermostat valve 15 relatively increases the amount of cooling water flowing through the radiator 11 by increasing a valve opening degree for the cooling water passage 13 side when a cooling water temperature is high, and relatively reduces the amount of cooling water flowing through the radiator 11 by reducing the valve opening degree for the cooling water passage 13 side when the cooling water temperature is low. When the cooling water temperature is particularly low, such as prior to warm-up of the engine 2, the radiator 11 is bypassed entirely such that all of the cooling water flows through the bypass cooling water passage 14 side. On the other hand, a valve opening degree for the bypass cooling water passage 14 side is never fully closed. When the cooling water flow rate through the radiator 11 increases, the flow rate of the cooling water flowing through the bypass cooling water passage 14 decreases in comparison with a case where all of the cooling water flows through the bypass cooling water passage 14 side. However, the thermostat valve 15 never stops a flow completely.

The bypass cooling water passage 14 that bypasses the radiator 11 is constituted by a first bypass cooling water passage 24 and a second bypass cooling water passage 25. The first bypass cooling water passage 24 branches from the cooling water passage 13 so as to be connected directly to a heat exchanger 36 (will be described later). On the other hand, the second bypass cooling water passage 25 branches from the cooling water passage 13 so as to be connected to the heat exchanger 36 after passing through a waste heat recovery device 22.

The heat exchanger 36 is provided in the bypass cooling water passage 14 in order to exchange heat with refrigerant in a Rankine cycle 31. The heat exchanger 36 is formed by integrating a heater and a superheater. In other words, two cooling water passages 36a, 36b are provided substantially in series in the heat exchanger 36. Further, a refrigerant passage 36c through which the refrigerant of the Rankine cycle 31 flows is provided adjacent to the cooling water passages 36a, 36b so that heat can be exchanged between the refrigerant and the cooling water. Moreover, the respective passages 36a, 36b, 36c are configured such that when the entire heat exchanger 36 is seen from above, the refrigerant of the Rankine cycle 31 and the cooling water flow in opposite directions.

More specifically, the cooling water passage 36a, which is positioned on an upstream side (a left side in FIG. 1) in terms of the refrigerant of the Rankine cycle 31, is interposed in the first bypass cooling water passage 24. A heat exchanger left side part constituted by the cooling water passage 36a and the part of the refrigerant passage that is adjacent to the cooling water passage 36a serves as a heater that heats the refrigerant of the Rankine cycle 31 flowing through the refrigerant passage 36c by introducing the cooling water exiting the engine 2 directly into the cooling water passage 36a.

Cooling water that has passed through the waste heat recovery device 22 is introduced into the other cooling water passage 36b, which is positioned on a downstream side (a right side in FIG. 1) in terms of the refrigerant of the Rankine cycle 31, through the second bypass cooling water passage 25. A heat exchanger right side part (a downstream side) constituted by the cooling water passage 36b and the part of the refrigerant passage that is adjacent to the cooling water passage 36b serves as a superheater that superheats the refrigerant flowing through the refrigerant passage 36c by introducing cooling water that has been heated by exhaust gas in an engine outlet into the cooling water passage 36b.

A cooling water passage 22a of the waste heat recovery device 22 is provided adjacent to an exhaust pipe 5. By introducing the cooling water from the outlet of the engine 2 into the cooling water passage 22a of the waste heat recovery device 22, the cooling water can be heated to approximately 110 to 115° C., for example, by the high-temperature exhaust gas. The cooling water passage 22a is configured such that when the entire waste heat recovery device 22 is seen from above, the exhaust gas and the cooling water flow in opposite directions.

A control valve 26 is interposed in the second bypass cooling water passage 25 in which the waste heat recovery device 22 is provided. In order to ensure that the temperature of the cooling water in the interior of the engine 2 does not exceed an allowable temperature (100° C., for example) at which the engine efficiency does not deteriorate and knocking does not occur, for example, an opening degree of the control valve 26 is reduced when a temperature detected by a cooling water temperature sensor 74 provided at the outlet of the engine 2 reaches or exceeds a predetermined value. As a result, the amount of cooling water passing through the waste heat recovery device 22 is reduced when the temperature (an engine water temperature) of the cooling water in the interior of the engine 2 approaches the allowable temperature. Therefore, the engine water temperature can be reliably prevented from exceeding the allowable temperature.

On the other hand, in a case where the flow rate through the second bypass cooling water passage 25 is reduced such that the cooling water temperature is increased excessively by the waste heat recovery device 22 to cause the cooling water to evaporate (or boil), the efficiency of the heat exchanger 36 decreases. Moreover, the cooling water flow through the cooling water passages may deteriorate such that the temperature thereof rises excessively. In order to avoid this, a bypass exhaust pipe 6 that bypasses the waste heat recovery device 22, and a thermostat valve 7 that controls an amount of exhaust gas passing through the waste heat recovery device 22 and an amount of exhaust gas passing through the bypass exhaust pipe 6, are provided in a bifurcating portion of the bypass exhaust pipe 6. More specifically, a valve opening degree for the thermostat valve 7 is adjusted on the basis of the temperature of the cooling water exiting the waste heat recovery device 22 such that the temperature of the cooling water exiting the waste heat recovery device 22 does not exceed a predetermined temperature (a boiling temperature of 120° C., for example).

The heat exchanger 36, the thermostat valve 7, and the waste heat recovery device 22 are formed integrally as a waste heat recovery unit and disposed midway in the exhaust pipe under a floor substantially centrally in a vehicle width direction (not shown in the drawings). The thermostat valve 7 may be a comparatively simple temperature sensitive valve employing a bimetal or the like, or a control valve controlled by a controller into which output from a temperature sensor is inputted. When an amount of heat exchange from the exhaust gas to the cooling water is adjusted using the thermostat valve 7, a comparatively large delay occurs. Therefore, it is difficult to ensure that the engine water temperature does not exceed the allowable temperature by adjusting the thermostat valve 7 alone. However, the control valve 26 of the second bypass cooling water passage 25 is controlled on the basis of the engine water temperature (an outlet temperature), and therefore a heat recovery amount can be reduced quickly so that the engine water temperature is reliably prevented from exceeding the allowable temperature. Moreover, when a degree of leeway remains before the engine water temperature reaches the allowable temperature, the waste heat recovery amount can be increased by performing heat exchange until the temperature of the cooling water exiting the waste heat recovery device 22 reaches a high temperature (110 to 115° C., for example) exceeding the allowable temperature of the engine water temperature. The cooling water exiting the cooling water passage 36b converges with the first bypass cooling water passage 24 via the second bypass cooling water passage 25.

Once the temperature of the cooling water flowing from the bypass cooling water passage 14 toward the thermostat valve 15 has been reduced sufficiently by heat exchange with the refrigerant of the Rankine cycle 31 in the heat exchanger 36, for example, a valve opening degree for the thermostat valve 15 on the cooling water passage 13 side is reduced. As a result, the amount of cooling water passing through the radiator 11 is relatively reduced. Conversely, when the Rankine cycle 31 is inoperative or the like such that the temperature of the cooling water flowing from the bypass cooling water passage 14 toward the thermostat valve 15 increases, the valve opening degree for the thermostat valve 15 on the cooling water passage 13 side is increased. As a result, the amount of cooling water passing through the radiator 11 is relatively increased. By operating the thermostat valve 15 in this manner, the cooling water temperature of the engine 2 is maintained at an appropriate temperature such that an appropriate amount of heat is supplied to (or recovered by) the Rankine cycle 31.

Next, the Rankine cycle 31 will be described. The Rankine cycle 31 is a system for recovering waste heat from the engine 2 in the refrigerant via the cooling water of the engine 2, and regenerating the recovered waste heat as power. The Rankine cycle 31 includes a refrigerant pump 32, the heat exchanger 36 serving as a superheater, an expansion device 37, and a condenser 38. These respective constituent elements are connected by refrigerant passages 41 to 44 through which the refrigerant (R134a or the like) circulates.

A shaft of the refrigerant pump 32 is disposed coaxially with and coupled to an output shaft of the expansion device 37 such that the refrigerant pump 32 is driven by output (power) generated by the expansion device 37, and power generated thereby is supplied to an output shaft (a crankshaft) of the engine 2 via a belt transmission mechanism. Here, the belt transmission mechanism is constituted by a pump pulley 33, a belt 34, and a crank pulley 2a. More specifically, the shaft of the refrigerant pump 32 and the output shaft of the expansion device 37 are disposed parallel to the output shaft of the engine 2, and the belt 34 is wound between the pump pulley 33, which is provided on a tip end of the shaft of the refrigerant pump 32, and the crank pulley 2a. It should be noted that in the present embodiment, a gear type pump is employed as the refrigerant pump 32 and a scroll type expansion device is employed as the expansion device 37.

Further, an electromagnetic clutch (hereinafter, referred to as an "expansion device clutch") 35 is provided between the pump pulley 33 and the refrigerant pump 32 to be capable of engaging and disengaging the refrigerant pump 32 and the expansion device 37 to and from the engine 2. For this reason, when the output generated by the expansion device 37 exceeds a driving force of the refrigerant pump 32 and friction generated by a rotary body (i.e. when an estimated expansion device torque is positive), the expansion device clutch 35 is engaged. As a result, rotation of the engine output shaft can be assisted by the output generated by the expansion device 37. When the rotation of the engine output shaft is assisted using energy obtained through waste heat recovery in this manner, an improvement in fuel efficiency can be achieved. Moreover, energy required to drive the refrigerant pump 32 in order to circulate the refrigerant can be provided by the recovered waste heat.

The refrigerant from the refrigerant pump 32 is supplied to the heat exchanger 36 through the refrigerant passage 41. The heat exchanger 36 is a heat exchanger that vaporizes the refrigerant so that the refrigerant is superheated by performing heat exchange between the refrigerant and the cooling water of the engine 2.

The refrigerant from the heat exchanger 36 is supplied to the expansion device 37 through the refrigerant passage 42. The expansion device 37 is a steam turbine that converts heat into rotational energy by expanding the vaporized and superheated refrigerant. Power recovered by the expansion device 37 is used to drive the refrigerant pump 32, and is transmitted to the engine 2 via the belt transmission mechanism (33, 34, 2a) in order to assist the rotation of the engine 2.

The refrigerant from the expansion device 37 is supplied to the condenser 38 through the refrigerant passage 43. The condenser 38 is a heat exchanger that cools the refrigerant so that the refrigerant is liquefied by performing heat exchange between the refrigerant and outside air. For this purpose, the condenser 38 is disposed parallel to the radiator 11 so as to be cooled by a radiator fan 12.

The refrigerant liquefied by the condenser 38 is returned to the refrigerant pump 32 through the refrigerant passage 44. Having been returned to the refrigerant pump 32, the refrigerant is sent back to the heat exchanger 36 by the refrigerant pump 32 so as to circulate through the respective constituent elements of the Rankine cycle 31.

Next, a refrigeration cycle 51 will be described. The refrigeration cycle 51 includes a compressor 52, a condenser 53, and an evaporator 55.

The compressor 52 is a fluid machine that is driven by the engine 2 to compress refrigerant in the refrigeration cycle 51 to a high temperature and a high pressure. More specifically, a compressor pulley is fixed to a drive shaft of the compressor 52, and a belt is wound around the compressor pulley and the crank pulley. The compressor 52 is driven by transmitting driving force from the engine 2 to the compressor pulley via the belt. Further, an electromagnetic clutch (hereinafter, referred to as a "compressor clutch") is provided between the compressor pulley and the compressor 52 to be capable of connecting and disconnecting the compressor 52 and the compressor pulley.

The refrigerant from the compressor 52 is supplied to the condenser 53 through a refrigerant passage 56. The condenser 53 is a heat exchanger that condenses the refrigerant so that the refrigerant is liquefied by performing heat exchange between the refrigerant and outside air. The condenser 53 is disposed parallel to the radiator 11 so as to be cooled by vehicle speed wind or the cooling fan 12.

The liquefied refrigerant from the condenser 53 is supplied to the evaporator 55 through a refrigerant passage 57. The evaporator 55 is disposed in a case of an air conditioning unit, similarly to a heater core (not shown in the drawings). The evaporator 55 is a heat exchanger that evaporates the liquid refrigerant from the condenser 53, and cools air conditioning air from a blower fan using latent heat of evaporation generated at this time.

The refrigerant evaporated by the evaporator 55 is returned to the compressor 52 through a refrigerant passage 58. It should be noted that a mixing ratio between the air conditioning air cooled by the evaporator 55 and air conditioning air heated by the heater core is modified in accordance with an opening degree of an air mixing door so as to be adjusted to a temperature set by a passenger.

Various valves are provided as appropriate on a circuit of the Rankine cycle 31 in order to control the refrigerant flowing through the cycle. For example, an expansion device bypass passage 65 is provided so as to bypass the expansion device 37 from an upstream side of the expansion device 37 and converge upstream of a check valve 64, and a bypass valve 66 is provided in the expansion device bypass passage 65. The bypass valve 66 is a solenoid type on-off valve.

Further, a check valve 63 is provided in the refrigerant passage 41 connecting the refrigerant pump 32 to the heat exchanger 36 to prevent the refrigerant from flowing back to the refrigerant pump 32 from the heat exchanger 36. Moreover, the check valve 64 is provided in the refrigerant passage 43 connecting the expansion device 37 to the condenser 38 to prevent the refrigerant from flowing back to the expansion device 37 from the condenser 38.

Signals from pressure sensors 72, 73 and temperature sensors 81, 82 that detect respective pressures and temperatures at two points in the refrigerant passages 41 to 44 and the bypass passage 65 are input into an engine controller 71. Here, one of the points is the refrigerant passage 42 that extends from an outlet of the heat exchanger 36 to an inlet of the expansion device 37. The pressure sensor 72 detects a pressure (hereinafter, referred to as a "heat exchanger outlet pressure") Pd in the refrigerant passage 42, and the temperature sensor 82 detects a temperature (hereinafter, referred to as a "heat exchanger outlet temperature") Td in the refrigerant passage 42. The other point is the refrigerant passage 44 that extends from an outlet of the condenser 38 to an inlet of the refrigerant pump 32. The pressure sensor 73 detects a pressure (hereinafter, referred to as a "refrigerant pump inlet pressure") Ps in the refrigerant passage 44, and the temperature sensor 82 detects a temperature (hereinafter, referred to as a "refrigerant pump inlet temperature") Ts in the refrigerant passage 44.

The engine controller 71 controls engagement and disengagement of the expansion device clutch 35 and opening and closing of the bypass valve 66 on the basis of these input signals in accordance with a predetermined operating condition.

For example, at the start of an operation of the Rankine cycle 31, in order to determine whether the refrigerant is leaking from the refrigerant passages and the bypass passage or not, the refrigerant pump inlet pressure Ps detected by the pressure sensor 73 and the heat exchanger outlet pressure Pd detected by the pressure sensor 72 are used. More specifically, when the refrigerant pump inlet pressure Ps and the heat exchanger outlet pressure Pd are higher than atmospheric pressure, it is determined that the refrigerant is not leaking from the refrigerant passages 41 to 44 and the bypass passage 65. On the other hand, when the refrigerant pump inlet pressure Ps and the heat exchanger outlet pressure Pd are equal to or lower than atmospheric pressure, it is determined that the refrigerant is leaking from the refrigerant passages 41 to 44 and the bypass passage 65. When it is determined that the refrigerant is not leaking from the refrigerant passages 41 to 44 and the bypass passage 65, the operation of the Rankine cycle 31 is started, but when it is determined that the refrigerant is leaking from the refrigerant passages 41 to 44 and the bypass passage 65, the operation of the Rankine cycle 31 is not started.

Further, the expansion device torque (regenerated power) obtained by the operation of the Rankine cycle 31 is estimated to determine whether the expansion device torque is positive or negative. The reason for this is that the expansion device torque is required to manage a target drive torque required by a vehicle 1. A target engine torque is determined from the target drive torque, but when an accessory load is applied to the engine 2, the torque generated by the engine 2 must be increased correspondingly to obtain the target drive torque. Similarly, if the target drive torque would be greatly surpassed by engaging the expansion device clutch 35 so that the expansion device torque is applied to the engine 2, this torque application is deemed unnecessary, and therefore the expansion device clutch 35 is preferably disengaged. On the other hand, when the expansion device clutch is engaged in a case where the expansion device torque is negative, the engine torque actually decreases, and therefore the expansion device clutch 35 is preferably disengaged at this time. Thus, since the expansion device torque is required to manage the target drive torque, the expansion device torque is estimated in order to determine the approximate value thereof.

For example, the expansion device clutch 35 is engaged when the estimated expansion device torque is positive (when the rotation of the engine output shaft can be assisted), and the expansion device clutch 35 is disengaged when the estimated expansion device torque is zero or negative.

As regards a method of estimating the expansion device torque, the expansion device torque may be estimated simply on the basis of a value obtained by subtracting the refrigerant pump inlet pressure Ps from the heat exchanger outlet pressure Pd. The expansion device torque is estimated to be steadily larger as the pressure difference between Pd and Ps increases. Alternatively, enthalpy h1 in the refrigerant flowing through the refrigerant passage 42 is calculated on the basis of the heat exchanger outlet pressure Pd and the heat exchanger outlet temperature Td, and enthalpy h2 in the refrigerant flowing through the refrigerant passage 44 is calculated on the basis of the refrigerant pump inlet pressure Ps and the refrigerant pump inlet temperature Ts. The expansion device torque is then estimated from a difference h2−h1 between the two enthalpy values. The expansion device torque is estimated to be steadily larger as the difference between h1 and h2 increases.

Here, the enthalpy h1 is a function of the heat exchanger outlet pressure Pd and the heat exchanger outlet temperature Td, and therefore a map of the enthalpy h1 having the heat exchanger outlet pressure Pd and the heat exchanger outlet temperature Td as parameters may be created in advance and stored. Similarly, the enthalpy h2 is a function of the refrigerant pump inlet pressure Ps and the refrigerant pump inlet temperature Ts, and therefore a map of the enthalpy h2 having the refrigerant pump inlet pressure Ps and the refrigerant pump inlet temperature Ts as parameters may be created in advance and stored.

In addition, the heat exchanger outlet pressure Pd and the heat exchanger outlet temperature Td are also used to determine whether the pressure of the refrigerant flowing through the Rankine cycle 31 is abnormally high or not, or whether the temperature of the refrigerant flowing through the Rankine cycle is abnormally high or not. More specifically, when the heat exchanger outlet pressure Pd is equal to or lower than an upper limit pressure value, the pressure is determined not to be abnormally high, and when the heat exchanger outlet temperature Td is equal to or lower than an upper limit temperature value, the temperature is determined not to be abnormally high. In this case, the operation of the Rankine cycle 31 is continued. On the other hand, when the heat exchanger outlet pressure Pd exceeds the upper limit pressure value, the pressure is determined to be abnormally high, and when the heat exchanger outlet temperature Td exceeds the upper limit temperature value, the temperature is determined to be abnormally high. In this case, the operation of the Rankine cycle 31 is stopped.

When to operate the Rankine cycle 31, processing is executed in two stages. More specifically, in a first stage, the expansion device clutch 35 is first engaged and the bypass valve 66 is opened, whereby the refrigerant pump 32 is rotated idly such that the refrigerant spreads through all of the refrigerant passages 44, 41, 42, the bypass passage 65, and the refrigerant passage 43. In a second stage, the bypass valve 66 is closed such that evaporated refrigerant is supplied to the expansion device 37, whereby the expansion device 37 is driven.

On the other hand, in order to stop an operation of the Rankine cycle 31, the expansion device 37 is stopped by opening the bypass valve 66 and then disengaging the expansion device clutch 35 by applying an OFF signal to the expansion device clutch 35 after a predetermined time (a delay period) elapses following the opening timing of the bypass valve 66. When a front-rear differential pressure (hereinafter. referred to as an "expansion device front-rear differential pressure") exists in the expansion device 37, the expansion device 37 rotates, and therefore the expansion device front-rear differential pressure is eliminated by opening the bypass valve 66 so that the refrigerant bypasses the expansion device 37. Even after the expansion device front-rear differential pressure has been eliminated, the expansion device 37 continues to rotate thereafter by inertia, but the rotation thereof gradually decreases such that eventually, the expansion device 37 stops (the operation of the Rankine cycle 31 is stopped).

Here, the reason for disengaging the expansion device clutch 35 after a predetermined time elapses following the opening timing of the bypass valve 66 is as follows. When the expansion device clutch 35 is disengaged such that the expansion device 37 is disconnected from the rotary shaft of the engine before the bypass valve 66 is opened, the expansion device 37 enters a no-load state while the expansion device front-rear differential pressure continues to exist. As a result, a rotation speed of the expansion device 37 increases rapidly, causing the expansion device 37 to over-rotate. Hence, in order to avoid over-rotation of the expansion device 37, the bypass valve 66 is first opened, and the expansion device clutch 35 is then switched from an engaged state to a disengaged state after the front-rear differential pressure of the expansion device 37 has decreased.

When the expansion device 37 is stopped, the bypass valve 66 may remain stuck in a closed state even after an open command is outputted to the bypass valve 66. Hereinafter, a situation in which the bypass valve 66 remains stuck in the closed state even after an open command is outputted to the bypass valve 66 is referred to as "bypass valve closed sticking". When bypass valve closed sticking occurs, the refrigerant supply to the expansion device 37 cannot be stopped, and therefore the expansion device front-rear differential pressure continues to exist. Accordingly, when the expansion device clutch 35 is switched from the engaged state to the disengaged state after the predetermined time elapses following the timing at which the open command is outputted to the bypass valve 66, the rotation speed of the expansion device 37 may increase rapidly from the switch timing, causing the expansion device 37 to over-rotate. It is therefore necessary to consider countermeasures to be implemented when bypass valve closed sticking occurs (hereinafter, referred to as "during bypass valve closed sticking"). However, the conventional apparatus includes no description whatsoever of countermeasures to be implemented during bypass valve closed sticking.

Hence, in the present invention, when bypass valve closed sticking occurs while stopping the expansion device 37, processing (expansion device front-rear differential pressure limiting processing) is performed to limit the expansion device front-rear differential pressure to a predetermined fixed value while maintaining the expansion device clutch 35 in the engaged state. Here, the "fixed value" is an expansion device front-rear differential pressure at which the expansion device rotation speed remains at or below an allowable upper limit value (in other words, over-rotation exceeding the allowable upper limit value does not occur) even when the expansion device clutch 35 is switched from the engaged state to the disengaged state. This fixed value is determined in advance by adaptation. More specifically, in order to limit the expansion device front-rear differential pressure to the predetermined fixed value, processing (expansion device front-rear differential pressure reducing processing) is performed to reduce the expansion device front-rear differential pressure compared with a case where bypass valve closed sticking has not occurred (a case where the bypass valve is not fixed in the closed state).

For this purpose, processing described below in (1) and (2) is executed together in the first embodiment of the present invention as the processing for reducing the expansion device front-rear differential pressure.

(1) An amount of heat (an input heat amount) recovered in the refrigerant by the heat exchanger 36 is reduced compared with a case where bypass valve closed sticking has not occurred. The expansion device front-rear differential pressure is generated when heat is recovered in the refrigerant by the heat exchanger 36. To put it the other way round, when no heat is recovered in the refrigerant by the heat exchanger 36, the expansion device front-rear differential pressure decreases naturally.

(2) An amount of heat (a heat released amount) released from the refrigerant by the condenser 38 is reduced compared with a case where bypass valve closed sticking has not occurred. The reason for this is that when the refrigerant is not cooled by the condenser 38, the expansion device front-rear differential pressure decreases.

Figure 2:
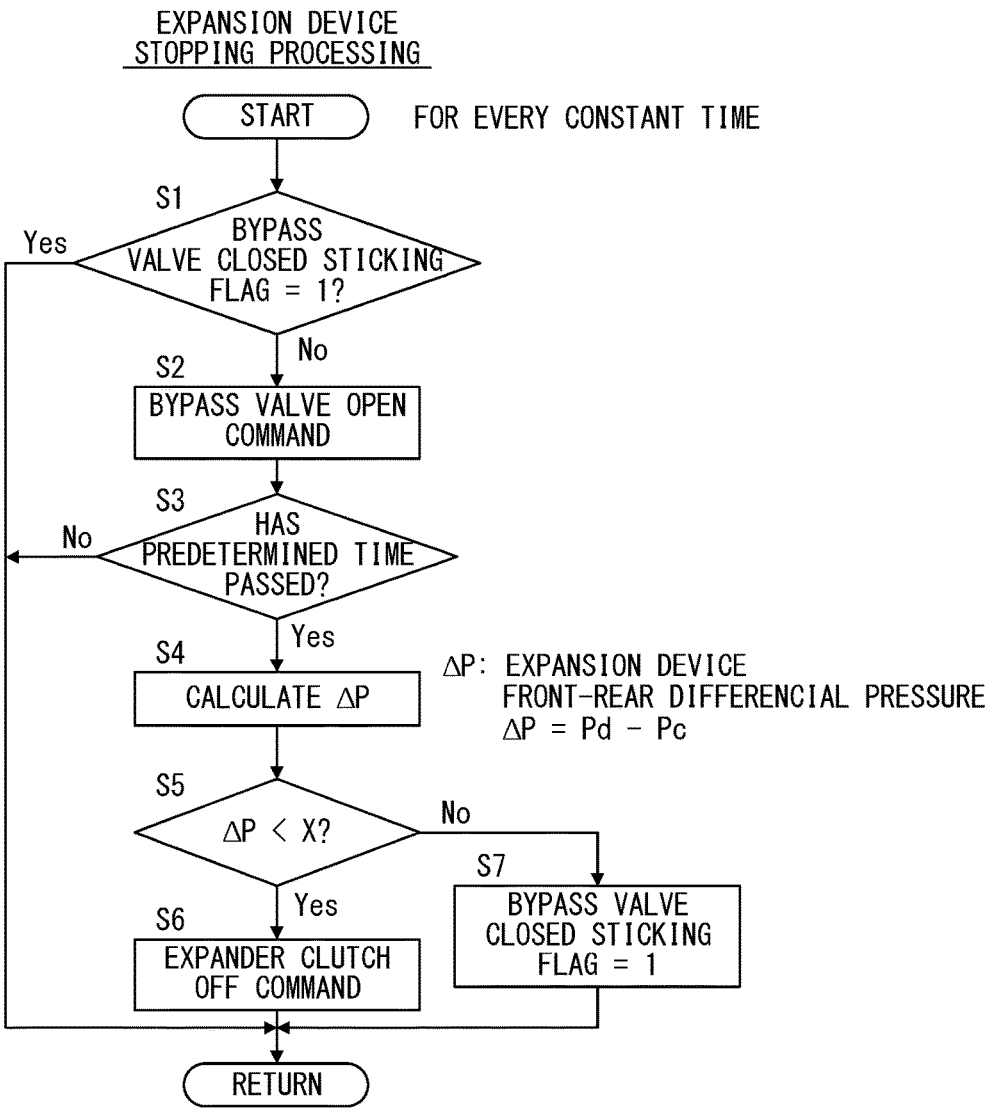
FIG. 2 is a flowchart illustrating expansion device stopping processing.

The processing of (1) and (2), executed by the engine controller 71, will be described below with reference to flowcharts. A flow shown in FIG. 2 is executed at fixed time intervals (every 10 ms, for example) in order to implement the expansion device stopping processing.

At Step 1, a bypass valve closed sticking flag (set initially at zero at the time of engine startup) is checked. It is assumed here that the bypass valve closed sticking flag=0, and therefore the routine advances to Step 2, where a command to open the bypass valve 66 is output.

At Step 3, a determination is made as to whether a predetermined time has elapsed after output of the command to open the bypass valve 66 or not. Here, the predetermined time is a period extending from the timing at which the expansion device clutch 35 is switched from the engaged state to the disengaged state to a timing at which the expansion device rotation speed in the disengaged state falls to or below the allowable upper limit value. The predetermined time is set in advance so as to include a degree of leeway. When it is determined that the predetermined time has not elapsed after output of the command to open the bypass valve 66, the current processing is terminated as it is.

When it is determined at Step 3 that the predetermined time has elapsed after output of the command to open the bypass valve 66, the routine advances to Step 4, where a pressure difference between the heat exchanger outlet pressure Pd, detected by the pressure sensor 72, and an expansion device outlet pressure Pc [MPa] is calculated as an expansion device front-rear differential pressure ΔP [MPa]. The expansion device outlet pressure Pc is detected by a pressure sensor 83 (see FIG. 1).

A pressure difference between the heat exchanger outlet pressure Pd detected by the pressure sensor 72 and the refrigerant pump inlet pressure Ps detected by the pressure sensor 73, for example, may be used instead as the expansion device front-rear differential pressure ΔP. In this case, the detection precision deteriorates slightly, but since the two existing pressure sensors 72, 73 are used, a cost increase can be avoided.

At Step 5, the expansion device front-rear differential pressure ΔP is compared with a predetermined value X [MPa]. Here, the predetermined value X is a preset value used to determine whether bypass valve closed sticking has occurred or not. When the expansion device front-rear differential pressure ΔP, which is obtained when the predetermined time has elapsed after output of the command to open the bypass valve 66, is smaller than the predetermined value X, it is determined that bypass valve closed sticking has not occurred, and an OFF command is outputted to the expansion device clutch 35 at Step 6.

When it is determined at Step 5 that the expansion device front-rear differential pressure ΔP, which is obtained when the predetermined time has elapsed after output of the command to open the bypass valve 66, equals or exceeds the predetermined value X, it is determined that bypass valve closed sticking has occurred, and the bypass valve closed sticking flag is set at 1 at Step 7. The bypass valve closed sticking flag is then used in a flow shown in FIG. 3 (will be described later). Since the bypass valve closed sticking flag=1 at Step 7, the routine cannot advance to Step 2 and onward from Step 1 during subsequent processing. In other words, when it is determined that the bypass valve closed sticking has occurred, the determination is not performed again.

Figure 3:
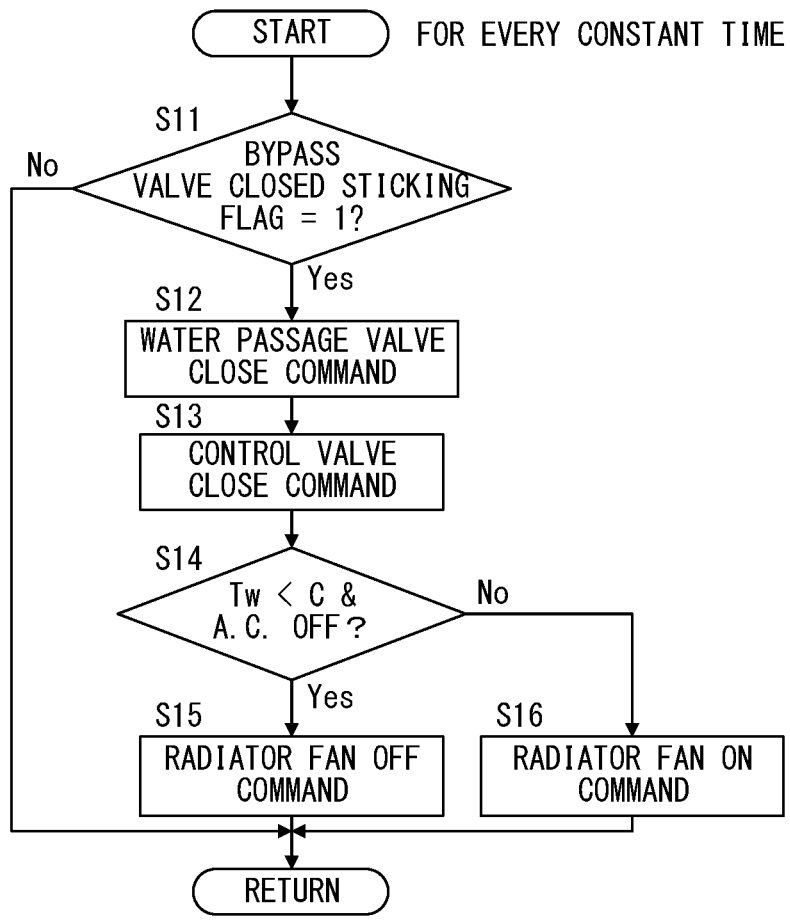
FIG. 3 is a flowchart illustrating expansion device front-rear differential pressure reducing processing.

The flow shown in FIG. 3 is executed at fixed time intervals (every 10 ms, for example) following the flow of FIG. 2 in order to implement processing to reduce the expansion device front-rear differential pressure during bypass valve closed sticking.

At Step 11, the bypass valve closed sticking flag (set in FIG. 2) is checked. When the bypass valve closed sticking flag=0, it is determined that bypass valve closed sticking has not occurred, and the processing is terminated as it is.

When it is determined at Step 11 that the bypass valve closed sticking flag=1, it is determined that bypass valve closed sticking has occurred, and the routine advances to Steps 12 and 13. At Steps 12 and 13, close commands are output to a water passage valve 85 and the control valve 26 in order to reduce the amount of heat (the input heat amount) recovered in the refrigerant by the heat exchanger 36. As shown in FIG. 1, the water passage valve 85 is a normally open on-off valve that is newly interposed in the first bypass cooling water passage 24 to reduce the amount of heat recovered in the refrigerant by the heat exchanger 36. Further, the control valve 26 is used as a second water passage valve for reducing the amount of heat recovered in the refrigerant by the heat exchanger 36. When the water passage valve 85 and the control valve 26 are closed, cooling water warmed by the engine 2 or the waste heat recovery device 22 does not flow through the heat exchanger 36, and therefore the amount of heat recovered in the refrigerant by the heat exchanger 36 is reduced. By reducing the amount of heat recovered in the refrigerant by the heat exchanger 36 before closing the water passage valve 85 and the control valve 26, the heat exchanger outlet pressure Pd is reduced. As a result, the front-rear differential pressure ΔP of the expansion device 37 is reduced before the water passage valve 85 and the control valve 26 are closed.

At Step 14, an engine cooling water temperature Tw [° C.] detected by the cooling water temperature sensor 74 is compared with a predetermined value C [° C.], and a state of an air-conditioning switch 59 (see FIG. 1) is checked. Here, a situation in which the cooling water of the engine 2 boils so that the engine cannot be cooled appropriately is known as overheating of the engine 2, and the predetermined value C is set in advance at a value for determining whether the engine 2 has overheated or not. When it is determined at Step 14 that the engine cooling water temperature Tw equals or exceeds the predetermined value C, it is determined that if the radiator fan 12 is switched OFF, the engine 2 may overheat, and therefore, the routine advances to Step 16, where an ON command is outputted to the radiator fan 12. The purpose of this Step is to prioritize processing for ensuring that the engine 2 does not overheat over the processing for reducing the expansion device front-rear differential pressure during bypass valve closed sticking. The reason why the radiator fan 12 is shared by the radiator 11 and the condenser 38 instead of providing the condenser 38 with a dedicated fan is to save space and reduce costs. However, since the fan 12 is shared, the processing for reducing the expansion device front-rear differential pressure during bypass valve closed sticking and the processing for ensuring that the engine 2 does not overheat may overlap. Hence, when the two types of processing overlap, the processing for ensuring that the engine 2 does not overheat is prioritized.

Further, when the air-conditioning switch 59 is switched ON at Step 14, it is determined that if the radiator fan 12 is switched OFF, cooling of the refrigerant by the condenser 53 will deteriorate (an air-conditioning effect will deteriorate). Therefore, the routine advances to Step 16, where an ON command is outputted to the radiator fan 12. The purpose of this Step is to prioritize processing for ensuring that cooling of the refrigerant by the condenser 53 does not deteriorate over the processing for reducing the expansion device front-rear differential pressure during bypass valve closed sticking. The reason why the radiator fan 12 is shared by the radiator 11 and the condenser 53 instead of providing the condenser 53 with a dedicated fan is to save space and reduce costs. However, since the fan 12 is shared, the processing for reducing the expansion device front-rear differential pressure during bypass valve closed sticking and the processing for ensuring that cooling of the refrigerant by the condenser 53 does not deteriorate may overlap. Thus, when the two types of processing overlap, the processing for ensuring that cooling of the refrigerant by the condenser 53 does not deteriorate is prioritized. In other words, in cases where the engine 2 would overheat or cooling of the refrigerant by the condenser 53 would deteriorate if the radiator fan 12 were switched OFF, the radiator fan 12 is not stopped.

When it is determined at Step 14 that the engine cooling water temperature Tw is lower than the predetermined value C and the air-conditioning switch 59 is switched OFF, the routine advances to Step 15. At Step 15, an OFF command is outputted to the radiator fan 12 in order to reduce the amount of heat (the heat released amount) released from the refrigerant by the condenser 38. The radiator fan 12 cools the refrigerant by blowing air onto the condenser 38 as well as cooling the radiator 11. When the amount of heat released from the refrigerant by the condenser 38 is reduced by stopping the radiator fan 12, cooling of the refrigerant by the condenser 38 deteriorates. When cooling deteriorates, the refrigerant temperature at the outlet of the condenser 38 increases correspondingly, and as a result, the expansion device front-rear differential pressure decreases in comparison with the differential pressure before the radiator fan 12 is stopped.

On the other hand, when the radiator fan 12 is stopped, the engine cooling water can no longer be cooled sufficiently, and therefore the temperature of the engine cooling water increases in comparison with the temperature before the radiator fan 12 is stopped, with the result that the engine 2 may overheat. Moreover, if the radiator fan 12 is stopped while the air-conditioning switch 59 is switched ON, the vehicle interior cannot be cooled sufficiently. Hence, when the engine cooling water temperature Tw reaches or exceeds the predetermined value C at Step 14 after an OFF command has been outputted to the radiator fan 12, the routine advances to Step 16, where an ON command is outputted to the radiator fan 12. Further, when the air-conditioning switch 59 is switched from OFF to ON after an OFF command has been outputted to the radiator fan 12, the routine advances to Step 16, where an ON command is outputted to the radiator fan 12.

Here, actions and effects of the present embodiment will be described.

In the present embodiment, the apparatus includes: the transmission mechanism configured to couple the output shaft of the expansion device 37 to the rotary shaft of the engine 2 via the expansion device clutch 35; the expansion device bypass passage 65 (the passage through which the refrigerant exiting the heat exchanger flows so as to bypass the expansion device); and the bypass valve 66. When to stop the expansion device 37, the expansion device clutch 35 is switched from the engaged state to the disengaged state after switching the bypass valve 66 from the closed state to the open state. A prerequisite of this apparatus for utilizing heat wasted from an engine is that during bypass valve closed sticking (i.e. when the bypass valve becomes stuck in the closed state), expansion device front-rear differential pressure limiting processing is performed to limit the expansion device front-rear differential pressure while maintaining the expansion device clutch 35 in the engaged state. According to the present embodiment, over-rotation of the expansion device 37 can be prevented even in a case where bypass valve closed sticking occurs (even when the bypass valve becomes stuck in the closed state) while stopping the expansion device 37.

In the present embodiment, the expansion device front-rear differential pressure limiting processing is expansion device front-rear differential pressure reducing processing in which the expansion device front-rear differential pressure is reduced compared with a case where bypass valve closed sticking has not occurred (a case where the bypass valve is not stuck in the closed state). By reducing the expansion device front-rear differential pressure, over-rotation of the expansion device 37 can be prevented. When the expansion device front-rear differential pressure eventually reaches the vicinity of zero, the expansion device 37 can be stopped.

In the present embodiment, the expansion device front-rear differential pressure reducing processing is input heat amount reducing processing (see Steps 11, 12, and 13 in FIG. 3) in which the amount of heat recovered in the refrigerant by the heat exchanger 36 is reduced compared with a case where bypass valve closed sticking has not occurred (a case where the bypass valve is not stuck in the closed state). By reducing the amount of heat (the input heat amount) recovered by the heat exchanger 36, the expansion device front-rear differential pressure can be reduced.

In the present embodiment, the expansion device front-rear differential pressure reducing processing is heat released amount reducing processing (see Steps 11 and 15 in FIG. 3) in which the amount of heat released from the refrigerant by the condenser 38 is reduced compared with a case where bypass valve closed sticking has not occurred (a case where the bypass valve is not stuck in the closed state). By reducing the amount of heat (the heat released amount) released from the refrigerant by the condenser 38, the expansion device front-rear differential pressure can be reduced.

In the present embodiment, the condenser 38 is disposed parallel to the radiator 11 that cools the engine cooling water so that the condenser 38 is cooled by the radiator fan 12. In this case, if the radiator fan 12 is stopped while the temperature of the engine cooling water remains at or above the predetermined value C, the engine 2 may overheat. On the other hand, in the present embodiment, the heat released amount reducing processing is radiator fan stopping processing for stopping the radiator fan 12. When the engine cooling water temperature Tw is equal to or higher than the predetermined value C, the radiator fan 12 is not stopped (see Steps 11, 14, and 16 in FIG. 3) even during bypass valve closed sticking (even when the bypass valve is stuck in the closed state). As a result, the engine 2 can be prevented from overheating.

(Second Embodiment)

Figure 4:
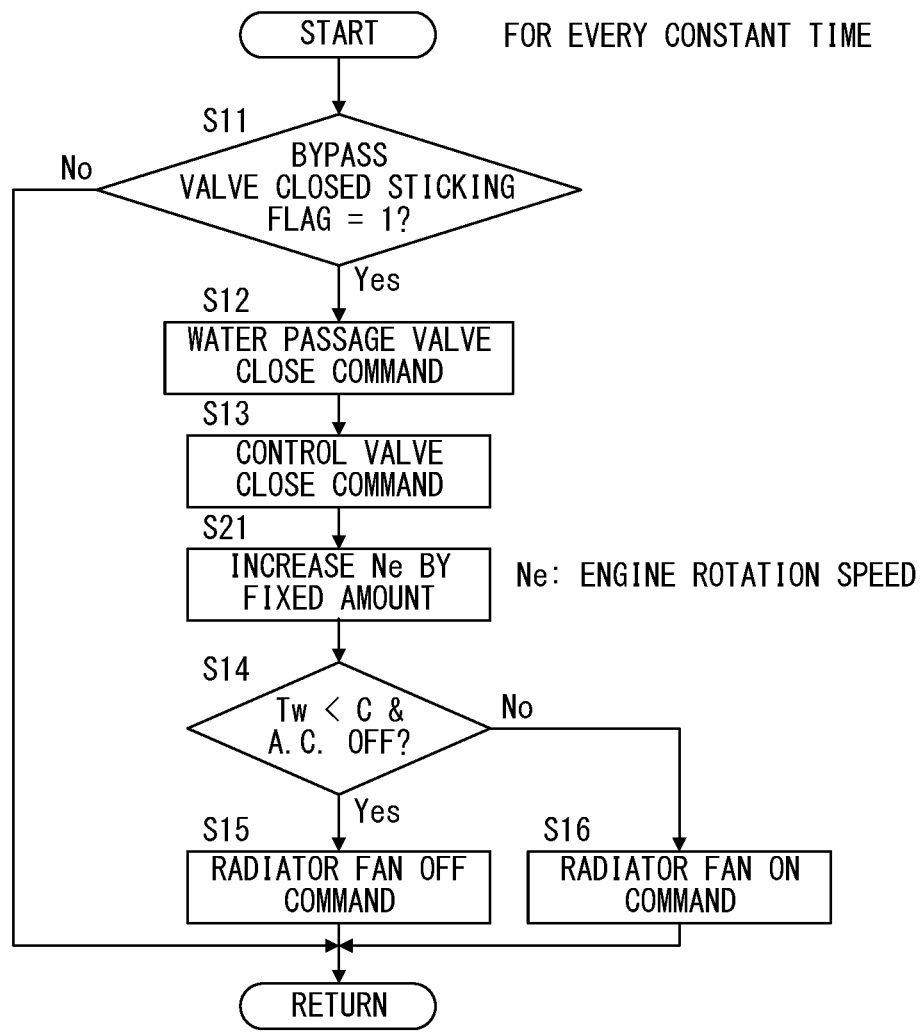
FIG. 4 is a flowchart illustrating expansion device front-rear differential pressure reducing processing according to a second embodiment.

A flow shown in FIG. 4 relates to a second embodiment, and replaces the flow of the first embodiment, shown in FIG. 3. In other words, the flow shown in FIG. 4 is executed at fixed time intervals (every 10 ms, for example) following the flow of FIG. 2 in order to implement processing for reducing the expansion device front-rear differential pressure during bypass valve closed sticking. Parts that are identical to the flow of FIG. 3 have been allocated identical reference symbols.

In the second embodiment, processing described below in (3) is executed additionally as the processing for reducing the expansion device front-rear differential pressure.

(3) A workload of the expansion device 37 is reduced in comparison with a case where bypass valve closed sticking has not occurred.

Parts that differ from the flow of the first embodiment, shown in FIG. 3, will mainly be described. When the bypass valve closed sticking flag=1 at Step 11, the routine advances to Step 21, where, in order to reduce the workload of the expansion device 37, an engine rotation speed Ne is increased by a fixed amount compared with a case where the bypass valve sticking flag=0.

Figure 13:
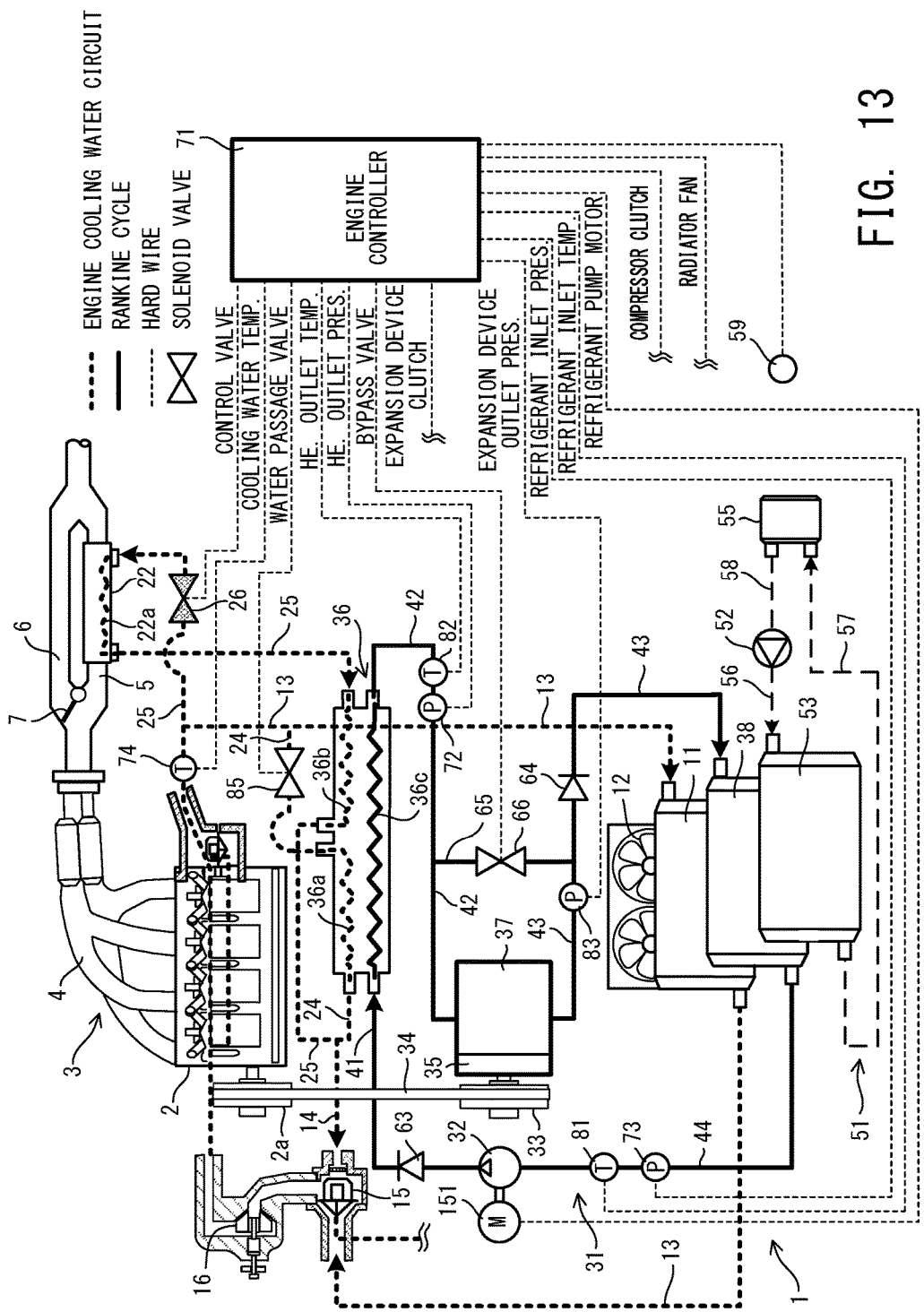
FIG. 13 is a schematic view showing an overall system configuration of a Rankine cycle according to a sixth embodiment.

The rotary shaft of the engine 2 co-rotates with the refrigerant pump 32, and therefore, by increasing the engine rotation speed Ne by a fixed amount, the rotation speed of the refrigerant pump 32 is increased, leading to an increase in the flow rate of the refrigerant discharged by the refrigerant pump 32 toward the heat exchanger 36. At the refrigerant flow rate before the rotation speed of the refrigerant pump 32 is increased, all of the refrigerant can be evaporated by the heat exchanger 36, but when the refrigerant flow rate is increased by increasing the rotation speed of the refrigerant pump 32, the amount of heat that can be received by the refrigerant in the heat exchanger 36 becomes insufficient, with the result that a part of the refrigerant can no longer be evaporated, for example. The reason for this is that the refrigerant flow rate is determined in advance so that all of the refrigerant can be evaporated at an amount of heat (an amount of obtained heat, an amount of regenerated heat) that can be recovered in the refrigerant by the heat exchanger 36, and therefore, when the refrigerant flows into the heat exchanger 36 at a higher flow rate than the predetermined flow rate, a part of the refrigerant cannot be evaporated. Thus, the fixed amount serving as the increase amount of the engine rotation speed is determined in advance so as to obtain a refrigerant flow rate at which a part of the refrigerant cannot be evaporated by the heat exchanger 36. It should be noted that when the refrigerant pump is driven by a motor 151, as shown in FIG. 13 (will be described later), a rotation speed of the motor 151 may be increased by a fixed amount compared with the case where the bypass valve sticking flag=0. In so doing, the amount of heat that can be received by the refrigerant in the heat exchanger 36 becomes insufficient, with the result that a part of the refrigerant can no longer be evaporated. The fixed amount serving as the amount by which to increase the motor rotation speed is determined in advance so as to obtain a refrigerant flow rate at which a part of the refrigerant cannot be evaporated by the heat exchanger 36.

When the refrigerant is supplied to the expansion device 37 in a state where a part thereof has not been evaporated by the heat exchanger 36, the workload of the expansion device 37 decreases correspondingly. When the workload of the expansion device 37 is reduced, the rotation speed of the expansion device 37 decreases.

Thus, in the second embodiment, the expansion device front-rear differential pressure reducing processing is expansion device workload reducing processing in which the workload of the expansion device 37 is reduced compared with a case where bypass valve closed sticking has not occurred (a case where the bypass valve is not stuck in the closed state). By reducing the workload of the expansion device 37, the rotation speed of the expansion device 37 can be reduced.

(Third Embodiment)

Figure 5:
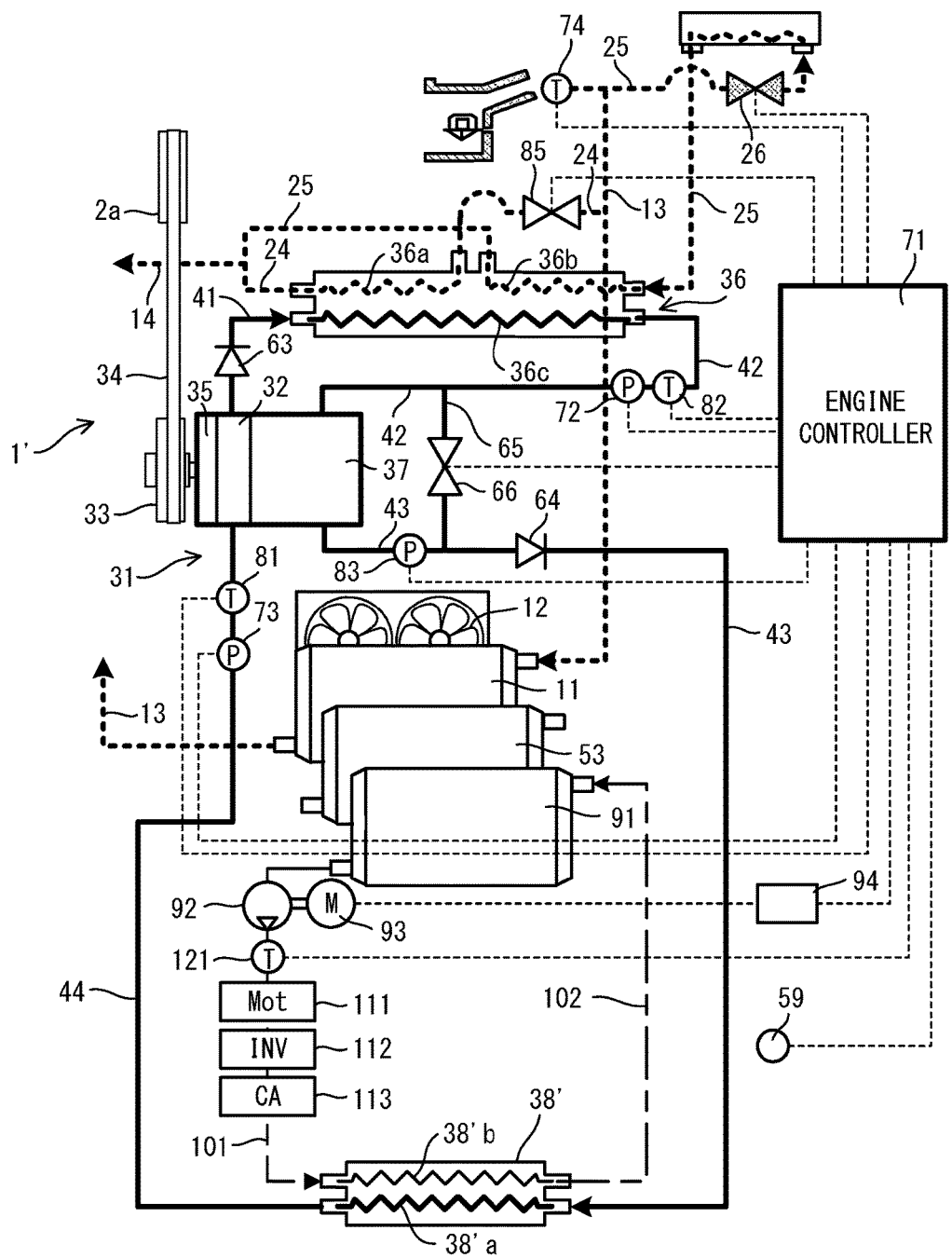
FIG. 5 is a schematic view showing an overall system configuration of a Rankine cycle according to a third embodiment.

FIG. 5 is a schematic view showing an overall system configuration of a Rankine cycle according to a third embodiment. Parts that are identical to the first embodiment, shown in FIG. 1, have been allocated identical reference numerals. It should be noted that the engine cooling water circuit has been partially omitted from FIG. 5. Further, in the refrigeration cycle 51, only the condenser 53 is shown.

The first and second embodiments were applied to the engine-driven vehicle 1, whereas the third embodiment is applied to a hybrid vehicle 1'. As is well known, a strong electric system constituted mainly by a strong electric battery, an inverter that converts a direct current from the strong electric battery into an alternating current, and a motor that can be rotated by the alternating current from the inverter is applied to the hybrid vehicle 1'. In this case, the motor and the inverter forming the strong electric system may both reach high temperatures, and therefore respective interiors of the motor and the inverter must be cooled so as not to exceed temperatures at which the functions of the motor and the inverter can be ensured.

For this purpose, when the Rankine cycle 31 is applied to the hybrid vehicle 1', the condenser configuration is modified from that of the engine-driven vehicle 1. More specifically, in the first and second embodiments, the condenser 38 is cooled by air, whereas in the third embodiment, a water-cooled (liquid-cooled) condenser 38' is employed.

The water-cooled condenser 38' is provided with a refrigerant passage 38'$a$ and a cooling water passage 38'$b$ (a cooling liquid passage). One end of the refrigerant passage 38'$a$ is connected to the refrigerant passage 43 of the Rankine cycle 31, and another end is connected to the refrigerant passage 44 of the Rankine cycle 31.

On the other hand, cooling water (hereinafter, referred to as "second cooling water", in order to differentiate the second cooling water from the engine cooling water) cooled by a sub-radiator 91 is circulated through the cooling water passage 38'$b$ via cooling water passages 101, 102 (cooling liquid passages). For this purpose, one end of each of the cooling water passages 101, 102 is connected to the cooling water passage 38'$b$, and another end of each of the cooling water passages 101 102 is connected to the sub-radiator 91. Here, when the entire water-cooled condenser 38' is seen from above, the second cooling water and the refrigerant of the Rankine cycle 31 flow in opposite directions.

The sub-radiator 91 is disposed parallel to the radiator 11 so as to be cooled by vehicle speed wind or the cooling fan 12. A cooling water pump 92 (a cooling liquid pump) is provided at an outlet of the sub-radiator 91 in order to circulate the second cooling water (second cooling liquid).

The cooling water pump 92 includes a current value adjustment device 94 that is driven by a motor 93 so as to be capable of adjusting a value of a current flowing through the motor 93. The value of the current flowing through the motor 93 can be duty-controlled (adjusted) by the current value adjustment device 94. A battery is used as a power supply of the current value adjustment device 94. For example, when an ON duty value applied to the current value adjustment device 94 is 0%, the motor 93 remains in a non-driven state and the cooling water pump 92 does not rotate. When the ON duty value applied to the current value adjustment device 94 is at a maximum of 100%, the motor 93 enters a driven state and the cooling water pump 92 rotates so as to discharge the cooling water at a maximum flow rate.

A cooling water passage 111 for the motor, a cooling water passage 112 for the inverter, and a water-cooled intercooler 113 are disposed in series in the cooling water passage 101 downstream of the cooling water pump 92 in order to cool the motor and the inverter forming the strong electric system. As a result, the motor and the inverter are cooled by cooling water from the sub-radiator 91 so as not to exceed temperatures at which the functions of the motor and the inverter can be ensured. A temperature sensor 121 for detecting the temperature of the second cooling water is also provided in the cooling water passage 101 downstream of the cooling water pump 92.

Figure 6:
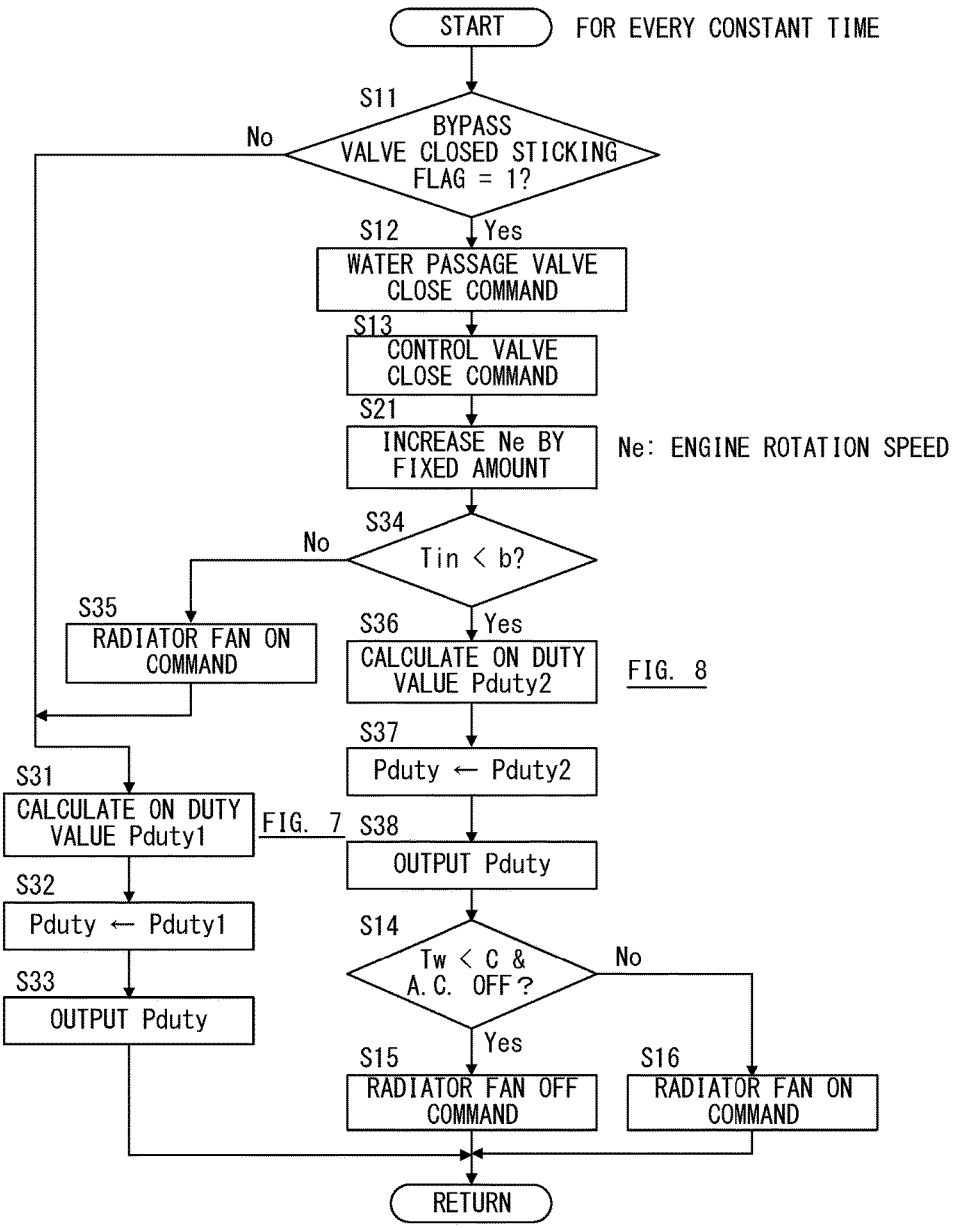
FIG. 6 is a flowchart illustrating expansion device front-rear differential pressure reducing processing according to the third embodiment.

A flow shown in FIG. 6 relates to the third embodiment, and replaces the flow of the second embodiment, shown in FIG. 4. In other words, the flow shown in FIG. 6 is executed at fixed time intervals (every 10 ms, for example) following the flow of FIG. 2 in order to implement processing to reduce the expansion device front-rear differential pressure during bypass valve closed sticking. Parts that are identical to the flow of the second embodiment, shown in FIG. 4, have been allocated identical reference symbols.

The flow of the third embodiment differs from the flow of the second embodiment, shown in FIG. 4, in that Steps 31 to 38 have been added in response to addition of the strong electric system. First, at Step 11, the bypass valve closed sticking flag (set in FIG. 2) is checked. When the bypass valve closed sticking flag=0, the routine advances to Steps 31 to 33.

Figure 7:
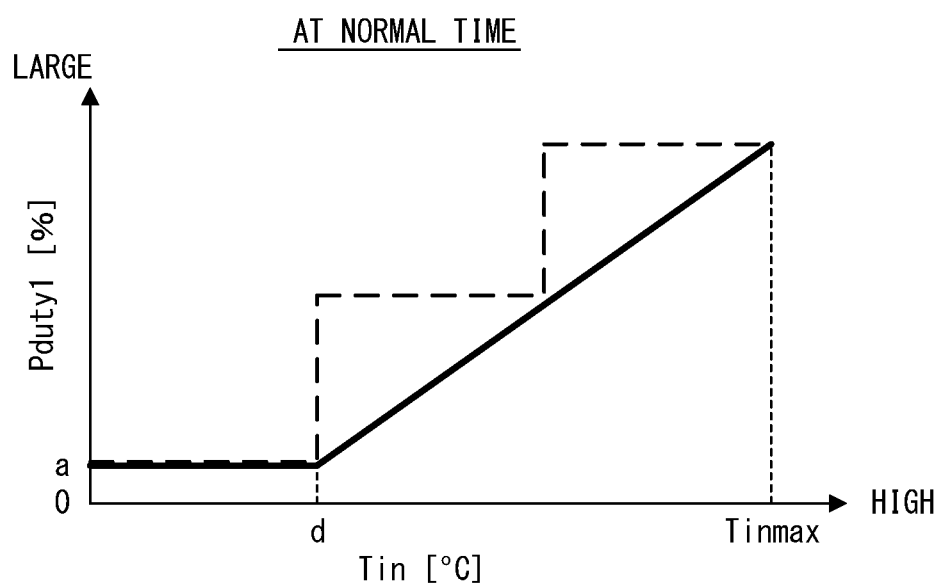
FIG. 7 is a characteristic diagram showing an ON duty value during a normal operation, according to the third embodiment.

At Step 31, an ON duty value Pduty1 [%] applied to the current value adjustment device 94 during a normal operation is calculated by retrieving a table having content shown in FIG. 7 in accordance with a second cooling water temperature Tin [° C.] detected by the temperature sensor 121. Here, "a normal operation" means a case where bypass valve closed sticking has not occurred.

As shown by a solid line in FIG. 7, the normal ON duty value Pduty1 remains (fixed) at a predetermined value a [%] in the vicinity of zero until the second cooling water temperature Tin reaches a predetermined value d [° C.], and then increases as the second cooling water temperature Tin increases. The reason for this is that in a temperature region where the second cooling water temperature Tin exceeds the predetermined value d, the rotation speed of the cooling water pump 92 increases as the second cooling water temperature Tin increases, leading to an increase in the amount of cooling water discharged by the cooling water pump 92, and as a result, the second cooling water is cooled more favorably by the sub-radiator 91. It should be noted that the characteristic of the ON duty value applied to the current value adjustment device 94 during a normal operation does not necessarily have to be a continuous value, as shown by the solid line, and may be a Stepped value, as shown by a superimposed dotted line.

At Step 32, the calculated ON duty value Pduty1 during the normal operation is set as an ON duty value Pduty [%], and the value of the ON duty value Pduty is outputted to a register at Step 33.

On the other hand, when the bypass valve closed sticking flag=1 at Step 11, the routine advances to Step 34, where the second cooling water temperature Tin [° C.] detected by the temperature sensor 121 is compared with a predetermined value b [° C.]. Hereinafter, a situation in which the second cooling water flowing through the motor and the inverter of the strong electric system enters a superheated state (evaporates, for example) such that the rotation of the motor decreases or the motor can no longer rotate will be defined as "the strong electric system has overheated". In accordance with this definition, the predetermined value b is set in advance at a value for determining whether the strong electric system has overheated or not.

When it is determined at Step 34 that the second cooling water temperature Tin equals or exceeds the predetermined value b, it is determined that if the radiator fan 12 is switched OFF so that the second cooling water is no longer cooled by the sub-radiator 91, the strong electric system may overheat. At this time, the routine advances to Step 35, where an ON command is outputted to the radiator fan 12, and the operations of Steps 31 to 33 are then executed. The purpose of this Step is to prioritize processing for ensuring that the strong electric system does not overheat over the processing for reducing the expansion device front-rear differential pressure during bypass valve closed sticking. The reason why the radiator fan 12 is shared by the radiator 11 and the sub-radiator 91 instead of providing the sub-radiator 91 with a dedicated fan is to save space and reduce costs. However, since the fan 12 is shared, the processing for reducing the expansion device front-rear differential pressure during bypass valve closed sticking and the processing for ensuring that the strong electric system does not overheat may overlap. Hence, when the two types of processing overlap, the processing for ensuring that the strong electric system does not overheat is prioritized. In other words, in a case where the strong electric system may overheat if the radiator fan 12 is stopped so that the second cooling water is no longer cooled by the sub-radiator 91, the radiator fan 12 is not stopped.

When it is determined at Step 34 that the second cooling water temperature Tin is lower than the predetermined value b, the routine advances to Steps 36 to 38. First, at Step 36, an ON duty value Pduty2 [%] applied to the current value adjustment device 94 during bypass valve closed sticking is calculated by retrieving a table having content shown in FIG. 8 in accordance with the second cooling water temperature Tin [° C.] detected by the temperature sensor 121.

Figure 8:
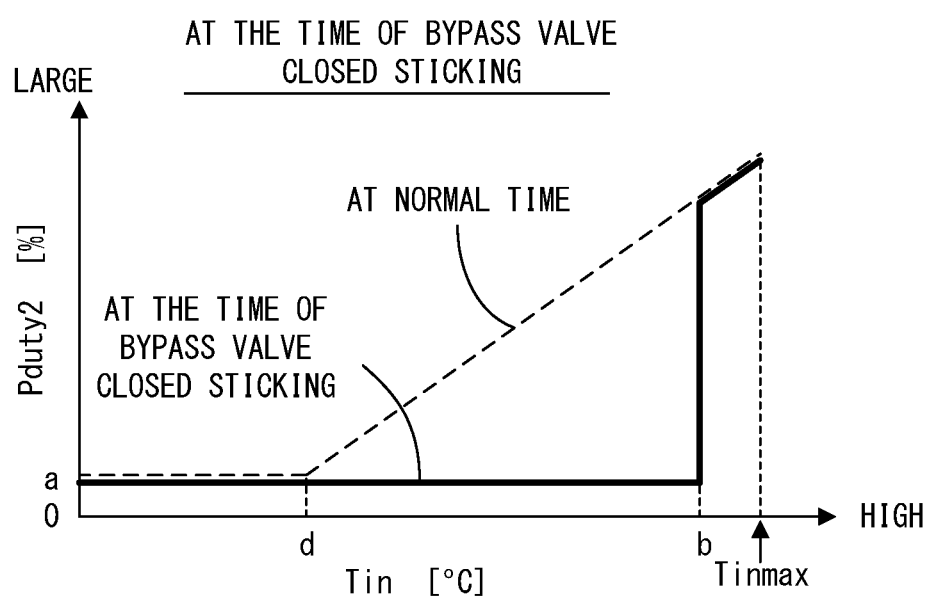
FIG. 8 is a characteristic diagram showing the ON duty value during bypass valve closed sticking, according to the third embodiment.

As shown in FIG. 8, the ON duty value Pduty2 applied to the current value adjustment device 94 during bypass valve closed sticking remains (is fixed) at the predetermined value a [%] in the vicinity of zero until the second cooling water temperature Tin reaches the predetermined value b [° C.], and then increases in a stepwise manner so as to align with the normal characteristic. For comparison, the normal characteristic is superimposed as a dotted line on FIG. 8. In other words, when the second cooling water temperature Tin is between the predetermined value d and the predetermined value b, the ON duty value applied to the current value adjustment device 94 is smaller than the ON duty value applied during a normal operation, and therefore the motor rotation speed decreases, leading to a reduction in the amount of cooling water discharged by the cooling water pump 92.

By reducing the motor rotation speed during bypass valve closed sticking so that the amount of cooling water discharged by the cooling water pump 92 decreases below the amount discharged during a normal operation, an amount of heat released from the second cooling water by the sub-radiator is reduced. When the amount of heat released from the second cooling water decreases, an amount of heat released into the second cooling water by the refrigerant in the water-cooled condenser 38' also decreases. When the amount of heat released into the second cooling water by the refrigerant in the water-cooled condenser 38' decreases, the water-cooled condenser 38' cools the refrigerant to a smaller extent than during a normal operation. In other words, during bypass valve closed sticking, the refrigerant at the outlet of the water-cooled condenser 38' is warmer than during a normal operation, and therefore the expansion device front-rear differential pressure decreases.

At Step 37, the ON duty value Pduty2 calculated during bypass valve closed sticking is set as the ON duty value Pduty [%], and the ON duty value Pduty is outputted to the register at Step 38.

The ON duty value Pduty output to the register at Steps 33 and 38 is applied to the current value adjustment device 94 by the engine controller 71.

The processing of Steps 14 to 16 is identical to the first embodiment.

Thus, in the third embodiment, the cooling water passages 101, 102 for circulating the second cooling water to the water-cooled condenser 38', the cooling water pump 92 interposed in the cooling water passages so as to be capable of duty-controlling the amount of discharged second cooling water, and the sub-radiator 91 for cooling the second cooling water are provided. The expansion device front-rear differential pressure reducing processing is discharge amount reducing processing (see Steps 11, 36, 37, and 38 in FIG. 6) in which the discharge amount of the cooling water pump 92 is reduced compared with a case where bypass valve closed sticking has not occurred (a case where the bypass valve is not stuck in the closed state). By reducing the discharge amount of the cooling water pump 92, the expansion device front-rear differential pressure can be reduced.

In the third embodiment, the sub-radiator 91 is disposed parallel to the radiator 11 for cooling the engine cooling water so that the second cooling water flowing through the sub-radiator 91 is cooled by the radiator fan 12. In this case, if the radiator fan 12 is stopped when the second cooling water temperature Tin at the cooling water pump outlet equals or exceeds the predetermined value b, the strong electric system may overheat. On the other hand, in the third embodiment, the radiator fan 12 is not stopped (see Steps 11, 34, and 35 in FIG. 6) when the second cooling water temperature Tin at the cooling water pump outlet equals or exceeds the predetermined value b even during bypass valve closed sticking (a case where the bypass valve is stuck in the closed state), and therefore the strong electric system can be prevented from overheating.

(Fourth and Fifth Embodiments)

Figure 9:
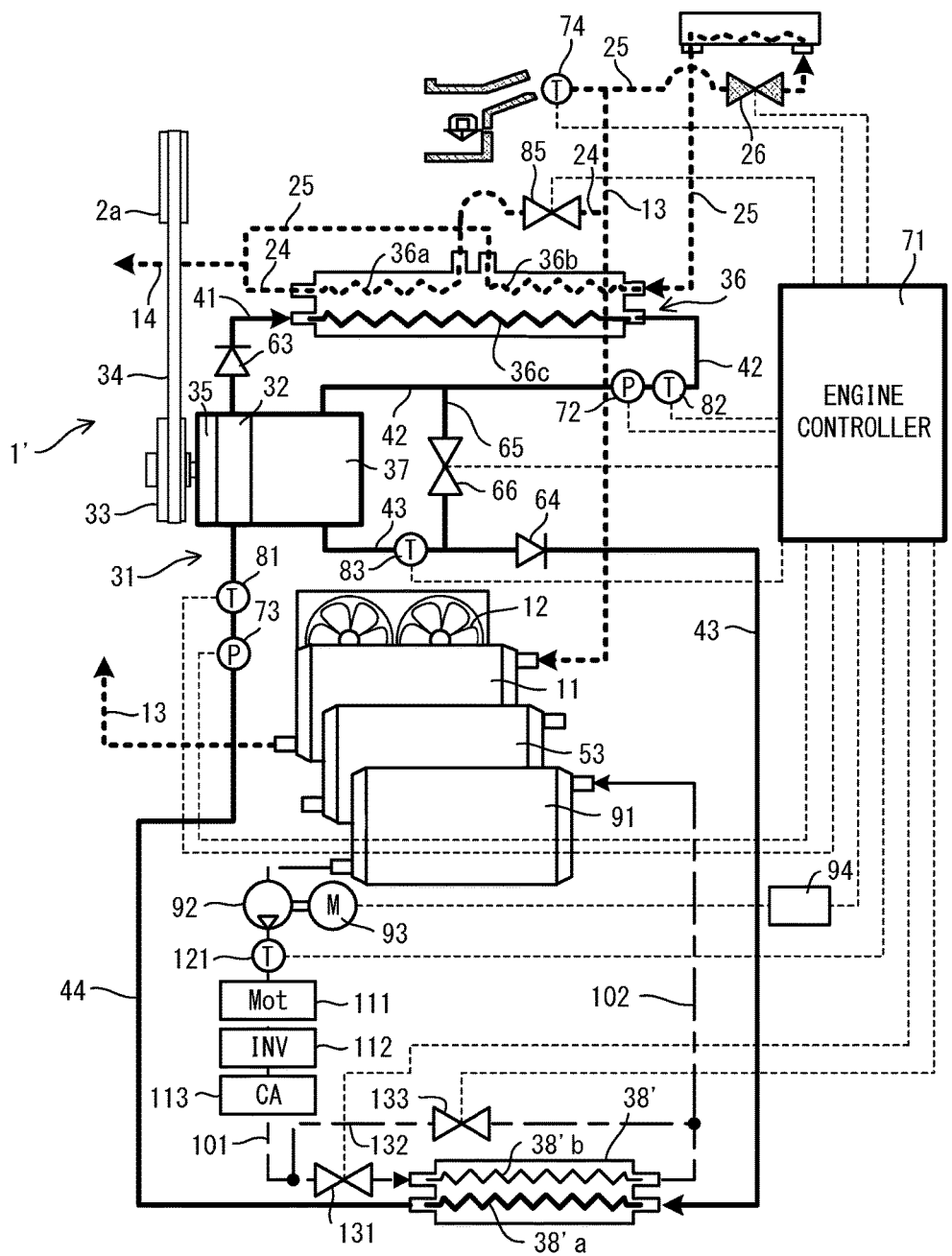
FIG. 9 is a schematic view showing an overall system configuration of a Rankine cycle according to a fourth embodiment.
Figure 11:
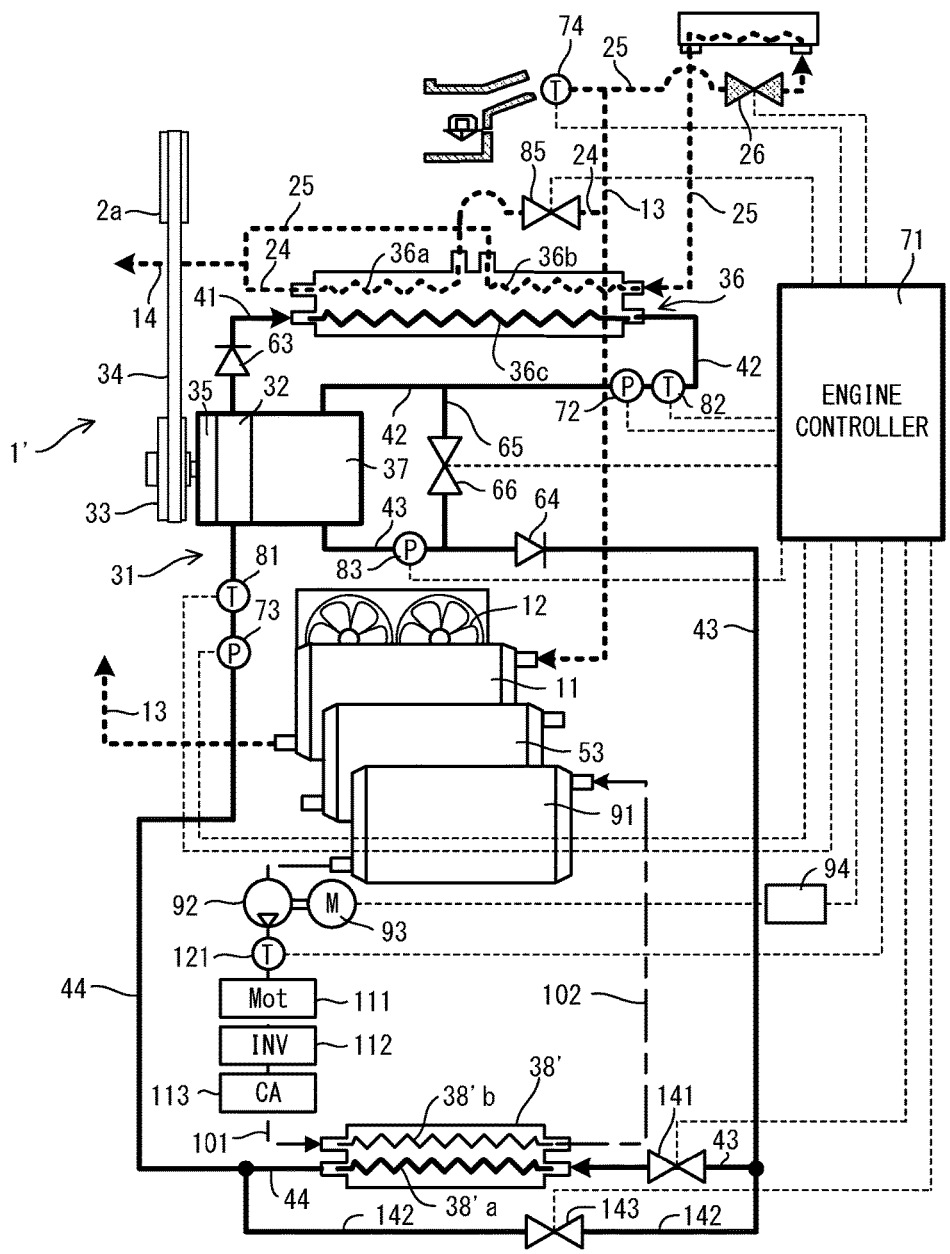
FIG. 11 is a schematic view showing an overall system configuration of a Rankine cycle according to a fifth embodiment.

FIGS. 9 and 11 are schematic views respectively showing overall system configurations of Rankine cycles according to fourth and fifth embodiments. Parts that are identical to the third embodiment, shown in FIG. 5, have been allocated identical reference numerals.

In the third embodiment, in order to reduce the amount of heat (a heat released amount) released from the refrigerant by the water-cooled condenser 38', it is determined that the amount of heat (a heat released amount) released from the second cooling water by the sub-radiator 91 is to be reduced, whereby the radiator fan 12 that blows air onto the sub-radiator 91 is stopped. In this case, the existing radiator fan 12 is used to blow air onto the sub-radiator 91, and therefore an increase in component costs can be avoided. However, when the radiator fan 12 is stopped, air is no longer blown onto the sub-radiator 91, and as a result, the strong electric system may overheat. In other words, the radiator fan 12 must be stopped within a range where the strong electric system cannot overheat, and therefore the range in which the radiator fan 12 can be used is limited.

Hence, in each of the fourth and fifth embodiments, two on-off valves 131, 133 or 141, 143 are provided in place of the radiator fan 12, and the expansion device front-rear differential pressure is reduced compared with a case where bypass valve closed sticking has not occurred by the two on-off valves. The expansion device front-rear differential pressure is reduced by either reducing the amount of heat (a heat released amount) released from the second cooling water in the water-cooled condenser 38' compared with a case where bypass valve closed sticking has not occurred, or reducing an amount of heat (a received heat amount) received by the refrigerant in the water-cooled condenser 38' compared with a case where bypass valve closed sticking has not occurred. In the fourth embodiment, the amount of heat released from the second cooling water in the water-cooled condenser 38' is reduced compared with the case where bypass valve closed sticking has not occurred. For this purpose, in the fourth embodiment, as shown in FIG. 9, a normally open first on-off valve 131 is interposed in the cooling water passage 101 between the water-cooled intercooler 113 and the water-cooled condenser 38'. A normally closed second on-off valve 133 is interposed in a bypass cooling water passage 132 that branches from upstream of the first on-off valve 131 so as to bypass the cooling water passage 38'b of the water-cooled condenser 38', and converges with the cooling water passage 102.

Further, in the fifth embodiment, the amount of heat received by the refrigerant in the water-cooled condenser 38' is reduced compared with a case where bypass valve closed sticking has not occurred. For this purpose, in the fifth embodiment, as shown in FIG. 11, a normally open third on-off valve 141 is interposed in the refrigerant passage 43 between the check valve 64 and the water-cooled condenser 38'. A normally closed fourth on-off valve 143 is interposed in a bypass refrigerant passage 142 that branches from upstream of the third on-off valve 141 so as to bypass the refrigerant passage 38'a of the water-cooled condenser 38', and converges with the refrigerant passage 44.

Figure 10:
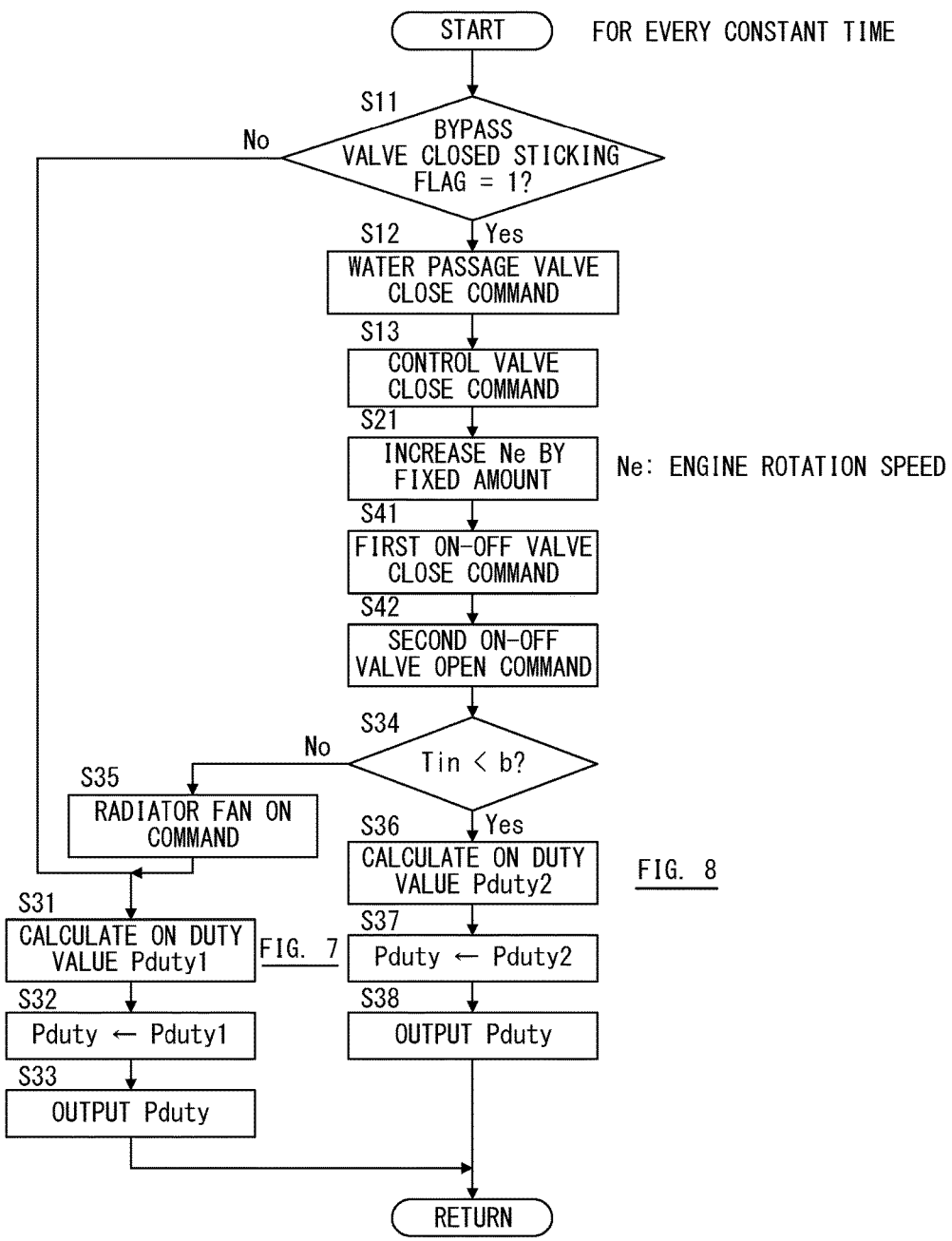
FIG. 10 is a flowchart illustrating expansion device front-rear differential pressure reducing processing according to the fourth embodiment.
Figure 12:
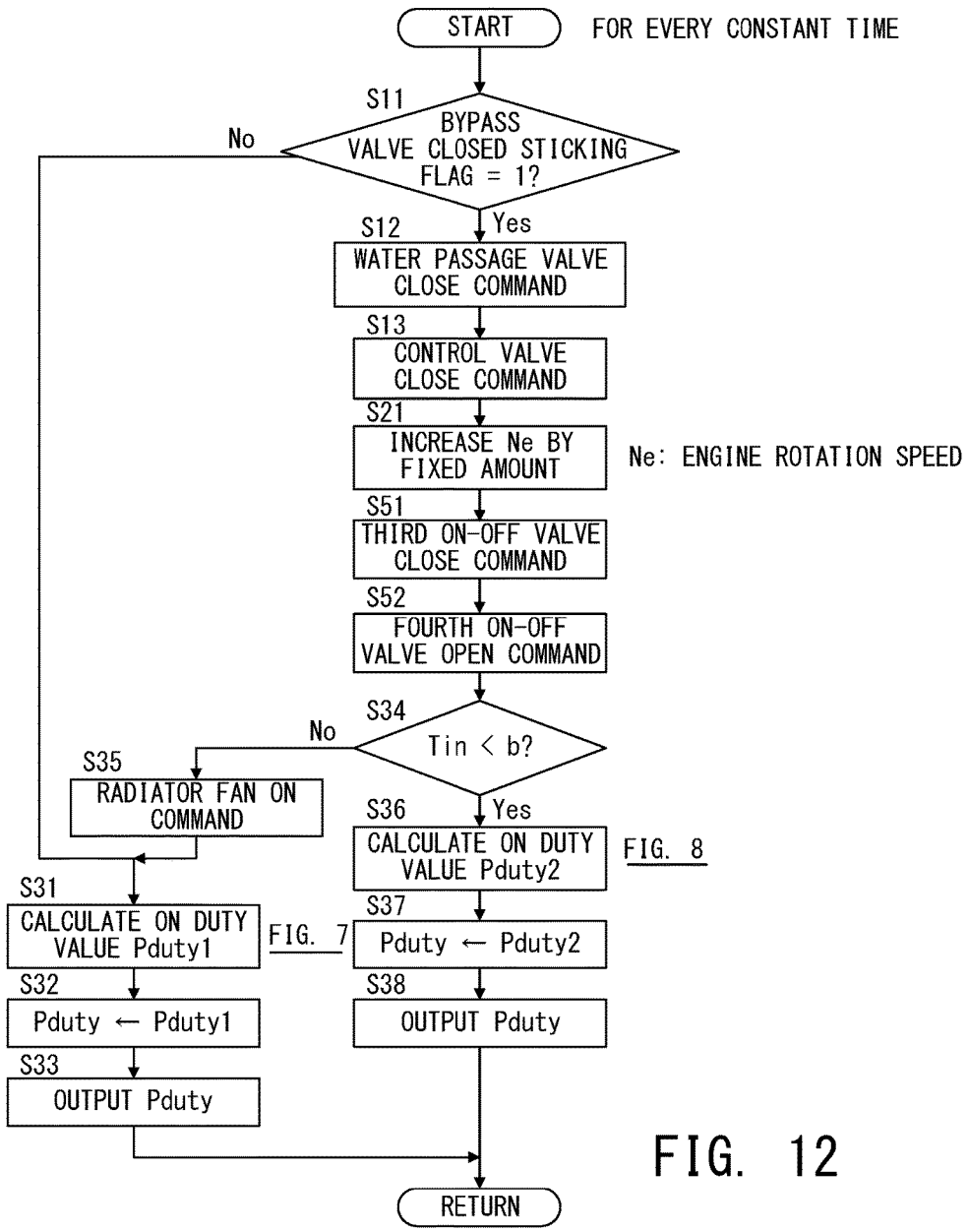
FIG. 12 is a flowchart illustrating expansion device front-rear differential pressure reducing processing according to the fifth embodiment.

Flows shown in FIGS. 10 and 12 relate respectively to the fourth and fifth embodiments, and replace the flow of the third embodiment, shown in FIG. 6. In other words, the flows shown in FIGS. 10 and 12 are executed at fixed time intervals (every 10 ms, for example) following the flow of FIG. 2 in order to implement processing to reduce the expansion device front-rear differential pressure during bypass valve closed sticking. Parts that are identical to the flow of the third embodiment, shown in FIG. 6, have been allocated identical reference symbols.

The flow of the fourth embodiment, shown in FIG. 10, differs from the flow of the third embodiment, shown in FIG. 6, in that Steps 14 to 16 of the flow shown in FIG. 16 have been eliminated, and Steps 41 and 42 have been added in their place. More specifically, at Steps 41 and 42, a close command is outputted to the first on-off valve 131 and an open command is outputted to the second on-off valve 133 in order to reduce the amount of heat released from the second cooling water in the water-cooled condenser 38'. As a result, the second cooling water no longer flows through the water-cooled condenser 38' (the second cooling water flows through the bypass cooling water passage 132), and therefore the amount of heat released from the second cooling water in the water-cooled condenser 38' decreases, leading to a corresponding increase in the refrigerant temperature at the outlet of the water-cooled condenser 38'.

Further, the flow of the fifth embodiment, shown in FIG. 12, differs from the flow of the third embodiment, shown in FIG. 6, in that Steps 14 to 16 of the flow shown in FIG. 16 have been eliminated, and Steps 51 and 52 have been added in their place. More specifically, at Steps 51 and 52, a close command is outputted to the third on-off valve 141 and an open command is outputted to the fourth on-off valve 143 in order to reduce the amount of heat received by the refrigerant in the water-cooled condenser 38'. As a result, the refrigerant flows through the bypass refrigerant passage 142 so as to bypass the water-cooled condenser 38', and therefore the amount of heat received by the refrigerant in the water-cooled condenser 38' decreases, leading to a corresponding increase in the refrigerant temperature at the outlet of the water-cooled condenser 38'.

In the fourth embodiment, the cooling water passages 101, 102 for circulating the second cooling water to the water-cooled condenser 38', the cooling water pump 92 interposed in the cooling water passages so as to be capable of duty-controlling the amount of discharged second cooling water, and the sub-radiator 91 for cooling the second cooling water are provided. The expansion device front-rear differential pressure reducing processing is heat released amount reducing processing (see Steps 11, 41, and 42 in FIG. 10) in which the amount of heat released from the second cooling water in the water-cooled condenser 38' is reduced compared with a case where bypass valve closed sticking has not occurred (a case where the bypass valve is not stuck in the closed state). By reducing the amount of heat (the heat released amount) released from the second cooling water in the water-cooled condenser 38', the expansion device front-rear differential pressure can be reduced.

In the fifth embodiment, the cooling water passages 101, 102 for circulating the second cooling water to the water-cooled condenser 38', the cooling water pump 92 interposed in the cooling water passages so as to be capable of duty-controlling the amount of discharged second cooling water, and the sub-radiator 91 for cooling the second cooling water are provided. The expansion device front-rear differential pressure reducing processing is heat received amount reducing processing (see Steps 11, 51, and 52 in FIG. 12) in which the amount of heat received by the refrigerant in the water-cooled condenser 38' is reduced compared with a case where bypass valve closed sticking has not occurred (a case where the bypass valve is not stuck in the closed state). By reducing the amount of heat (the received heat amount) received by the refrigerant in the water-cooled condenser 38', the expansion device front-rear differential pressure can be reduced.

In each of the fourth and fifth embodiments, the two new on-off valves 131, 133 or 141, 143 are provided additionally, leading to an increase in component costs, but the possibility of overheating of the strong electric system when the radiator fan 12 is stopped need not be taken into consideration. In other words, the range in which the two on-off valves 131, 133 or 141, 143 can be used is not limited.

In the fourth embodiment, a case where the two on-off valves 131, 133 are switched between two positions, namely fully open and fully closed, was described, but the present invention is not limited to this case, and instead, for example, two flow control valves capable of adjusting flow rates may be used in place of the two on-off valves 131, 133. During bypass valve closed sticking, the two flow control valves may be controlled so that the flow rate of the second cooling water flowing through the cooling water passage 38'*b* of the water-cooled condenser 38' is throttled and the remaining second cooling water flows through the bypass cooling water passage 132. Furthermore, instead of providing two flow control valves, a single flow control valve capable of adjusting both the flow rate of the second cooling water flowing through the cooling water passage 38'*b* of the water-cooled condenser 38' and the flow rate of the second cooling water flowing through the bypass cooling water passage 132 may be provided in the bifurcating portion of the bypass cooling water passage 132.

Similarly, in the fifth embodiment, a case where the two on-off valves 141, 143 are switched between two positions, namely fully open and fully closed, was described, but the present invention is not limited to this case, and instead, for example, two flow control valves capable of adjusting flow rates may be used in place of the two on-off valves 141, 143. During bypass valve closed sticking, the two flow control valves may be controlled so that the flow rate of the second cooling water flowing through the cooling water passage 38'*b* of the water-cooled condenser 38' is throttled and the remaining second cooling water flows through the bypass refrigerant passage 142. Furthermore, instead of providing two flow control valves, a single flow control valve capable of adjusting both the flow rate of the refrigerant flowing through the cooling water passage 38'*a* of the water-cooled condenser 38' and the flow rate of the second cooling water flowing through the bypass refrigerant passage 142 may be provided in the bifurcating portion of the bypass refrigerant passage 142.

(Sixth Embodiment)

FIG. 13 is a schematic view showing an overall system configuration of a Rankine cycle according to a sixth embodiment. Parts that are identical to the first embodiment, shown in FIG. 1, have been allocated identical reference numerals.

In the first embodiment, the shaft of the refrigerant pump 32 is disposed coaxially with and connected to the output shaft of the expansion device 37 such that the refrigerant pump 32 is driven by the output (power) generated by the expansion device 37, and power generated thereby is supplied to the output shaft of the engine 2 via the belt transmission mechanism. On the other hand, the sixth embodiment is applied to the same engine-driven vehicle 1 as the first embodiment. However, the sixth embodiment differs from the first embodiment in that the refrigerant pump 32 is configured slightly differently. More specifically, the output shaft of the expansion device 37 is provided parallel to the output shaft of the engine 2 such that the two shafts are connected by the belt transmission mechanism (33, 34, 2*a*) via the expansion device clutch 35, and the refrigerant pump 32 is driven by the motor 151.

Likewise with the configuration of the sixth embodiment, in which the refrigerant pump 32 and the expansion device 37 are not disposed coaxially, the flows of the first and second embodiments, shown in FIGS. 2 to 4, can be applied as is, and therefore identical actions and effects to the first and second embodiments can be obtained.

In the third, fourth, and fifth embodiments, the water-cooled condenser 38' was described, but the condenser need not be cooled by water, and any liquid-cooled condenser may be used.

DESCRIPTION OF REFERENCE NUMERALS 1 engine-driven vehicle
1' hybrid vehicle
2 engine
2*a* crank pulley (part of transmission mechanism)
31 Rankine cycle
32 refrigerant pump
33 pump pulley (part of transmission mechanism)
34 belt (part of transmission mechanism)
35 expansion device clutch (electromagnetic clutch)
36 heat exchanger
37 expansion device
38 condenser
38' water-cooled condenser (liquid-cooled condenser)
66 bypass valve
71 engine controller
91 sub-radiator
92 cooling water pump (cooling liquid pump)

93 motor
94 current value adjustment device
101, 102 cooling water passage (cooling liquid passage)
131 first on-off valve
133 second on-off valve
141 third on-off valve
143 fourth on-off valve

The invention claimed is:

1. An apparatus for utilizing heat wasted from an engine, comprising:
   a Rankine cycle including:
      a heat exchanger that recovers waste heat from the engine in a refrigerant;
      an expansion device that generates power using the refrigerant at an outlet of the heat exchanger;
      a condenser that condenses the refrigerant exiting the expansion device; and
      a refrigerant pump that supplies the refrigerant exiting the condenser to the heat exchanger;
   a transmission mechanism configured to couple an output shaft of the expansion device to a rotary shaft of the engine via an electromagnetic clutch, the electromagnetic clutch being configured to be engaged and disengaged;
   a passage through which the refrigerant exiting the heat exchanger flows so as to bypass the expansion device;
   a bypass valve interposed in the passage, and
   a controller
   wherein, the controller is programmed to:
   switch the electromagnetic clutch from an engaged state to a disengaged state after switching the bypass valve from a closed state to an open state to stop the expansion device and
   perform expansion device front-rear differential pressure limiting processing in which a front-rear differential pressure of the expansion device is limited while maintaining the electromagnetic clutch in the engaged state, in a case where the bypass valve becomes stuck in the closed state.

2. The apparatus for utilizing heat wasted from an engine as defined in claim 1, wherein over-rotation of the expansion device is prevented by the front-rear differential pressure limiting processing while stopping the expansion device.

3. The apparatus for utilizing heat wasted from an engine as defined in claim 1,
   wherein the expansion device front-rear differential pressure limiting processing is
   expansion device front-rear differential pressure reducing processing
   wherein the controller is programmed to:
   reduce the expansion device front-rear differential pressure compared with a case where the bypass valve is not stuck in the closed state.

4. The apparatus for utilizing heat wasted from an engine as defined in claim 3,
   wherein the expansion device front-rear differential pressure reducing processing is input heat amount reducing processing
   wherein the controller is programmed to:
   reduce an amount of heat recovered in the refrigerant by the heat exchanger compared with a case where the bypass valve is not stuck in the closed state.

5. The apparatus for utilizing heat wasted from an engine as defined in claim 3,
   wherein the expansion device front-rear differential pressure reducing processing is heat released amount reducing processing
   wherein the controller is programmed to:
   reduce an amount of heat released from the refrigerant by the condenser compared with a case where the bypass valve is not stuck in the closed state.

6. The apparatus for utilizing heat wasted from an engine as defined in claim 5,
   wherein the condenser is disposed parallel to a radiator for cooling engine cooling water so that the condenser is cooled by a radiator fan,
   wherein the heat released amount reducing processing is radiator fan stopping processing in which the radiator fan is stopped, and
   wherein the controller is programmed:
   not to stop the radiator fan even in a case where the bypass valve is stuck in the closed state when a temperature of the engine cooling water equals or exceeds a predetermined value defined in advance.

7. The apparatus for utilizing heat wasted from an engine as defined in claim 3,
   wherein the expansion device front-rear differential pressure reducing processing is expansion device workload reducing processing
   wherein the controller is programmed to:
   reduce a workload of the expansion device.

8. The apparatus for utilizing heat wasted from an engine as defined in claim 3,
   wherein the condenser is a liquid-cooled condenser,
   wherein the apparatus for utilizing heat wasted from an engine further comprises:
   a cooling liquid passage for circulating second cooling liquid to the liquid-cooled condenser, the second cooling liquid being different from engine cooling water;
   a cooling liquid pump interposed in the cooling liquid passage, the cooling liquid pump being configured to adjust a discharge amount of the second cooling liquid; and
   a sub-radiator for cooling the second cooling liquid, and
   wherein the expansion device front-rear differential pressure reducing processing is discharge amount reducing processing
   wherein the controller is programmed to:
   reduce a discharge amount of the cooling liquid pump compared with a case where the bypass valve is not stuck in the closed state.

9. The apparatus for utilizing heat wasted from an engine as defined in claim 8,
   wherein the sub-radiator is disposed parallel to a radiator for cooling the engine cooling water so that the sub-radiator is cooled by a radiator fan,
   wherein the controller is programmed:
   not to stop the radiator fan even in a case where the bypass valve is stuck in the closed state when a second cooling liquid temperature at an outlet of the cooling liquid pump equals or exceeds a predetermined value.

10. The apparatus for utilizing heat wasted from an engine as defined in claim 3,
    wherein the condenser is a liquid-cooled condenser,
    wherein the apparatus for utilizing heat wasted from an engine further comprises:
    a cooling liquid passage for circulating second cooling liquid to the liquid-cooled condenser, the second cooling liquid being different from engine cooling water;
    a cooling liquid pump interposed in the cooling liquid passage, the cooling liquid pump being configured to adjust a discharge amount of the second cooling liquid; and a sub-radiator for cooling the second cooling liquid, and
wherein the expansion device front-rear differential pressure reducing processing is heat released amount reducing processing
wherein the controller is programmed to:
reduce an amount of heat released from the second cooling liquid in the liquid-cooled condenser compared with a case where the bypass valve is not stuck it the closed state.

11. The apparatus for utilizing heat wasted from an engine as defined in claim 3,
wherein the condenser is a liquid-cooled condenser,
wherein the apparatus for utilizing heat wasted from an engine further comprises:
a cooling liquid passage for circulating second cooling liquid to the liquid-cooled condenser, the second cooling liquid being different from engine cooling water;
a cooling liquid pump interposed in the cooling liquid passage, the cooling liquid pump being configured to adjust a discharge amount of the second cooling liquid; and
a sub-radiator for cooling the second cooling liquid, and
wherein the expansion device front-rear differential pressure reducing processing is heat received amount reducing processing
wherein the controller is programmed to:
reduce an amount of heat received by the refrigerant in the liquid-cooled condenser compared with a case where the bypass valve is not stuck in the closed state.

* * * * *